US008571733B2

(12) United States Patent
Yamamoto et al.

(10) Patent No.: US 8,571,733 B2
(45) Date of Patent: Oct. 29, 2013

(54) HYBRID VEHICLE AND METHOD FOR CONTROLLING THE SAME

(75) Inventors: Masaya Yamamoto, Kasugai (JP); Norihiko Kato, Handa (JP); Haruki Sato, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/003,727

(22) PCT Filed: Oct. 31, 2008

(86) PCT No.: PCT/JP2008/069861
§ 371 (c)(1),
(2), (4) Date: Jan. 11, 2011

(87) PCT Pub. No.: WO2010/050039
PCT Pub. Date: May 6, 2010

(65) Prior Publication Data
US 2011/0178664 A1    Jul. 21, 2011

(51) Int. Cl.
*B60L 9/00*    (2006.01)
(52) U.S. Cl.
USPC .............. 701/22; 701/54; 701/36; 701/41; 701/63; 307/9.1; 307/82; 307/31; 307/104; 320/109; 320/104; 320/103; 320/101
(58) Field of Classification Search
USPC .............. 180/65.21, 65.265, 65.245, 65.25, 180/65.23, 65.28, 65.29; 701/22, 54, 36, 701/41, 63; 903/930, 904, 907, 906, 905; 700/295, 292; 320/109, 104, 103, 101; 307/9.1, 82, 31, 104, 10.7, 10.1
See application file for complete search history.

(56) References Cited

U.S. PATENT DOCUMENTS 6,047,787 A    4/2000  Deng et al.
6,608,396 B2 *  8/2003  Downer et al. ............. 290/40 C
(Continued)

FOREIGN PATENT DOCUMENTS

CN    101253089 A    8/2008
EP    1920985 A1    5/2008
(Continued)

OTHER PUBLICATIONS

US Office Action issued Jan. 31, 2013 for related U.S. Appl. No. 13/126,403.
(Continued)

*Primary Examiner* — Tuan C. To
*Assistant Examiner* — Jelani Smith
(74) *Attorney, Agent, or Firm* — Sughrue Mion, PLLC

(57) ABSTRACT

A power supply system includes a main power storage device and a plurality of sub power storage devices. A converter is connected to a selected one of the sub power storage devices to convert voltage between the selected sub power storage device and an electric power feeding line bidirectionally. In response to decrease in SOC of the selected sub power storage device being used, a request to switch the sub power storage device is generated and accordingly a switching process for a relay is performed. Here, while a process for starting or stopping an engine is being performed, the request to switch will not be generated even when decrease in SOC is detected. Likewise, while a process for switching the sub power storage device is being performed, the process for starting or stopping the engine will not be started even when a request to start or stop the engine is generated.

12 Claims, 10 Drawing Sheets

(56) References Cited

U.S. PATENT DOCUMENTS

| | | | |
|---|---|---|---|
| 8,004,109 B2* | 8/2011 | Komatsu | 307/9.1 |
| 2003/0107352 A1 | 6/2003 | Downer et al. | |
| 2003/0139859 A1* | 7/2003 | Hanada et al. | 701/22 |
| 2007/0247106 A1 | 10/2007 | Kawahara et al. | |
| 2008/0185197 A1 | 8/2008 | Nakamura et al. | |
| 2009/0058326 A1 | 3/2009 | Oyobe et al. | |
| 2009/0277701 A1* | 11/2009 | Soma et al. | 180/65.25 |
| 2010/0038962 A1* | 2/2010 | Komatsu | 307/10.1 |
| 2010/0096918 A1* | 4/2010 | Sawada et al. | 307/9.1 |
| 2010/0121507 A1* | 5/2010 | Ishii et al. | 701/22 |
| 2011/0040436 A1 | 2/2011 | Yamamoto et al. | |
| 2011/0066311 A1* | 3/2011 | Itagaki | 701/22 |
| 2011/0087395 A1 | 4/2011 | Yamamoto et al. | |
| 2011/0208383 A1 | 8/2011 | Yamamoto et al. | |
| 2011/0251745 A1 | 10/2011 | Yamamoto et al. | |
| 2011/0257825 A1 | 10/2011 | Yamamoto et al. | |
| 2012/0010771 A1 | 1/2012 | Kato et al. | |
| 2012/0016549 A1 | 1/2012 | Katsumata et al. | |
| 2012/0022738 A1 | 1/2012 | Kato et al. | |
| 2012/0089290 A1 | 4/2012 | Kato et al. | |

FOREIGN PATENT DOCUMENTS

| | | |
|---|---|---|
| JP | 2003-209969 A | 7/2003 |
| JP | 2004-359032 A | 12/2004 |
| JP | 2006-077641 A | 3/2006 |
| JP | 2007-062589 A | 3/2007 |
| JP | 2007-062639 A | 3/2007 |
| JP | 2007-098981 A | 4/2007 |
| JP | 2007-269249 A | 10/2007 |
| JP | 2007-282375 A | 10/2007 |
| JP | 2008-109840 A | 5/2008 |
| JP | 2008-154439 A | 7/2008 |
| JP | 2008-167620 A | 7/2008 |
| JP | 2008-220084 A | 9/2008 |

OTHER PUBLICATIONS

US Office Action issued Nov. 19, 2012 for related U.S. Appl. No. 13/259,445.

US Office Action issued May 16, 2012 for related U.S. Appl. No. 13/259,445.

International Search Report issued Jul. 21, 2009 for PCT/JP2009/060589.

U.S. Notice of Allowance dated May 14, 2013 issued in U.S. Appl. No. 13/126,403.

U.S. Notice of Allowance dated Jun. 24, 2013 issued in U.S. Appl. No. 13/259,445.

* cited by examiner

HYBRID VEHICLE AND METHOD FOR CONTROLLING THE SAME

CROSS REFERENCE TO RELATED APPLICATIONS

This application is a National Stage of International Application No. PCT/JP2008/069861 filed Oct. 31, 2008, the content of which is incorporated herein by reference in its entirety.

TECHNICAL FIELD

The present invention relates to a hybrid vehicle and a method for controlling the hybrid vehicle, and more particularly to control of a hybrid vehicle mounted with a main power supply device and a plurality of sub power storage devices as sources of electric power for the vehicle to travel.

BACKGROUND ART

In recent years, electrically powered vehicles such as electric vehicles, hybrid vehicles, fuel cell vehicles and the like have been developed into practical use as environmentally friendly vehicles. These electrically powered vehicles are each mounted with a motor generating force for driving the vehicle as well as a power supply system configured to include a power storage device supplying electric power for driving the motor. The hybrid vehicle is configured to be also able to travel by directly or indirectly using the output energy of an internal combustion engine.

In particular, it has been proposed to configure a hybrid vehicle in such a manner that allows a power storage device mounted on the vehicle to be charged by means of a power supply external to the vehicle (hereinafter also referred to as "external power supply"). There has accordingly been a demand for an increased distance over which these electrically powered vehicles can travel using the electric power stored in the vehicle-mounted power storage device. In the following, charging of a vehicle-mounted power storage device by an external power supply will also be referred to simply as "external charging".

For example, Japanese Patent Laying-Open No. 2008-109840 (Patent Document 1) and Japanese Patent Laying-Open No. 2003-209969 (Patent Document 2) describe a power supply system having a plurality of power storage devices (batteries) connected in parallel. The power supply system described in Patent Document 1 and Patent Document 2 includes a voltage converter (converter) provided for each power storage device (battery) and serving as a charging/discharging adjustment mechanism. In contrast, Japanese Patent Laying-Open No. 2008-167620 (Patent Document 3) describes a power supply device in a vehicle mounted with a main power storage device and a plurality of sub power storage devices. The power supply device is configured to include a converter associated with the main power storage device and a converter shared by the plurality of sub power storage devices. This configuration can be employed to have a reduced number of device components and an increased amount of energy that can be stored.

Patent Document 1: Japanese Patent Laying-Open No. 2008-109840

Patent Document 2: Japanese Patent Laying-Open No. 2003-209969

Patent Document 3: Japanese Patent Laying-Open No. 2008-167620

DISCLOSURE OF THE INVENTION

Problems to be Solved by the Invention

In the configuration described in Patent Document 3, one of a plurality of sub power storage devices is selectively connected to the converter, and the main power storage device and the selected sub power storage device supply electric power for driving the motor used for driving the vehicle. In such a power supply system, when the SOC (State of Charge) of the sub power storage device in use decreases, another sub power storage device is newly connected to the converter. Namely, a plurality of sub power storage devices are used by turns so as to extend the distance over which the vehicle can travel with the stored electric energy (EV (Electric Vehicle) travel distance). Regarding such a configuration, however, it is only the electric power of the main power storage device that is available while the connected sub power storage device is being switched to another sub power storage device, resulting in decrease of the electric power that can be input and output to and from the power supply system as a whole.

For a hybrid vehicle, traveling with only the motor output or traveling with both the motor output and the engine output is selected depending on the traveling condition of the vehicle. Accordingly, the engine is operated intermittently, which is accompanied by a process for starting or stopping the engine while the vehicle is traveling.

When the engine is to be started and stopped, a request to charge/discharge is made to the power supply system. Specifically, when the engine is to be started, the motor's electric power is output from the power supply system for cranking the engine. When the engine is to be stopped, the motor's electric power is input/output to/from the power supply system for controlling speed reduction by driving the motor after cutting fuel, and for using regenerative braking immediately before stopping, so as to reduce vibration.

As such, if switch of the connected sub power storage device in the power supply system and start or stop of the engine are done simultaneously, the power that can be generated for driving the vehicle varies, which may affect the vehicle's drivability.

The present invention has been made to solve such a problem, and an object of the invention is, for a hybrid vehicle having a power supply configured to include main and sub power storage devices and share a voltage converter (converter) by a plurality of sub power storage devices, to prevent the process for switching a sub power storage from adversely affecting the vehicle's drivability.

Means for Solving the Problems

According to the present invention, a hybrid vehicle includes a motor for generating power to drive the vehicle, an internal combustion engine, a main power storage device, an electric power feeding line, a first voltage converter, a plurality of sub power storage devices provided in parallel to each other, a second voltage converter, a connection unit, a switching control device, and a traveling control unit. The internal combustion engine is configured to be capable of outputting power to drive the vehicle independently of the motor. The electric power feeding line is configured to supply electric power to an inverter that controls and drives the motor. The first voltage converter is provided between the electric power feeding line and the main power storage device and configured to convert voltage bidirectionally. The second voltage converter is provided between the plurality of sub power storage devices and the electric power feeding line and configured to convert voltage between one of the plurality of sub power storage devices and the electric power feeding line bidirectionally. The connection unit is provided between the plurality of sub power storage devices and the second voltage converter and configured to selectively connect a selected sub power storage device among the plurality of sub power storage devices to the second voltage converter. The switching control device is configured to control selective connection between the plurality of sub power storage devices and the second voltage converter. The traveling control unit is configured to divide and thus assign a total required power for the hybrid vehicle to power output from the motor and power output from the internal combustion engine. The traveling control unit prohibits a process for starting the internal combustion engine which is being stopped and prohibits a process for stopping the internal combustion engine which is being operated, while a process for switching connection between the plurality of sub power storage devices and the second voltage converter is being performed.

Further, according to the present invention, a method for controlling a hybrid vehicle is provided, and the hybrid vehicle includes a motor, an internal combustion engine, a main power storage device, an electric power feeding line, a first voltage converter, a plurality of power storage devices, a second voltage converter, a connection unit, a switching control device, and a traveling control unit, as described above. The method includes the steps of determining whether a process for switching connection between the plurality of sub power storage devices and the second voltage converter is being performed, and prohibiting a process for starting the internal combustion engine being stopped and prohibiting a process for stopping the internal combustion engine being operated, while the process for switching is being performed.

Regarding the hybrid vehicle and the method for controlling the hybrid vehicle as described above, while a process for switching connection of sub power storage devices is being performed, execution of a process for starting and a process for stopping the internal combustion engine is prohibited. Therefore, there can be no input and output of electric power required for starting and stopping the engine. Consequently, variation of the vehicle driving power that can be output, due to the process for starting and stopping the engine, can be avoided, so that the process for switching connection can be prevented from adversely affecting the vehicle's drivability.

Preferably, the hybrid vehicle further includes a rotary element having a speed of rotation varied according to change in output of the internal combustion engine, and a protection control unit for generating one of a request to start the internal combustion engine and a request to stop the internal combustion engine for preventing excessive rotation of the rotary element. The traveling control unit permits one of the process for starting the internal combustion engine and the process for stopping the internal combustion engine, regardless of whether the process for switching connection is being performed, when the protection control unit generates one of the request to start the internal combustion engine and the request to stop the internal combustion engine. As for the control method, the method further includes the step of permitting one of the process for starting the internal combustion engine and the process for stopping the internal combustion engine, regardless of whether the process for switching connection is being performed, when the protection control unit generates one of the request to start the internal combustion engine and the request to stop the internal combustion engine.

Thus, when a request to start or stop the internal combustion engine is generated for the sake of component protection, the engine is started or stopped preferentially rather than ensuring the vehicle's drivability and accordingly device protection can be ensured.

Preferably, the switching control device includes a switching determination unit and a switching prohibition unit. The switching determination unit is configured to determine, based on a state of charge of a residual capacity (SOC) of the selected sub power storage device currently used, whether generation of a request to switch the selected sub power storage device is necessary. The switching prohibition unit is configured to instruct the switching determination unit not to generate the request to switch, while the process for starting or the process for stopping the internal combustion engine is being performed. As for the control method, the method further includes the steps of determining whether a process for switching connection between the plurality of sub power storage devices and the second voltage converter is being performed, and prohibiting a process for starting the internal combustion engine which is being stopped and prohibiting a process for stopping the internal combustion engine which is being operated, while the process for switching is being performed.

Thus, while the process for starting or the process for stopping the internal combustion engine is being performed, start of the process for switching connection of sub power storage devices can be prohibited, so that simultaneous execution of the process for starting or stopping the internal combustion engine and the process for switching connection of sub power storage devices can be surely avoided.

According to another aspect of the present invention, a hybrid vehicle includes a motor for generating power to drive the vehicle, an internal combustion engine, a main power storage device, an electric power feeding line, a first voltage converter, a plurality of sub power storage devices provided in parallel to each other, a second voltage converter, a connection unit, and a switching control device. The internal combustion engine is configured to be capable of outputting power to drive the vehicle independently of the motor. The electric power feeding line is configured to supply electric power to an inverter that controls and drives the motor. The first voltage converter is provided between the electric power feeding line and the main power storage device and configured to convert voltage bidirectionally. The second voltage converter is provided between the plurality of sub power storage devices and the electric power feeding line and configured to convert voltage between one of the plurality of sub power storage devices and the electric power feeding line bidirectionally. The connection unit is provided between the plurality of sub power storage devices and the second voltage converter and configured to selectively connect a selected sub power storage device among the plurality of sub power storage devices to the second voltage converter. The switching control device is configured to control selective connection between the plurality of sub power storage devices and the second voltage converter. The switching control device includes a switching determination unit for determining, based on a state of charge of a residual capacity (SOC) of the selected sub power storage device currently used, whether generation of a request to switch the selected sub power storage device is necessary, and a switching prohibition unit for instructing the switching determination unit not to generate the request to switch the selected sub power storage device, while a process for starting or a process for stopping the internal combustion engine is being performed.

Further, according to a further aspect of the present invention, a method for controlling a hybrid vehicle is provided, and the hybrid vehicle includes a motor, an internal combustion engine, a main power storage device, an electric power feeding line, a first voltage converter, a plurality of sub power storage devices, a second voltage converter, a connection unit, and a switching control device, as described above. The control method includes the steps of determining whether a process for switching connection between the plurality of sub power storage devices and the second voltage converter is being performed, and prohibiting a process for starting the internal combustion engine being stopped and prohibiting a process for stopping the internal combustion engine being operated, while the process for switching is being performed.

Regarding the hybrid vehicle and the method for controlling the hybrid vehicle as described above, while a process for starting or a process for stopping the internal combustion engine is being performed, start of a process for switching connection of sub power storage devices is prohibited. Therefore, there can be no input and output of electric power required for starting and stopping the engine, while the process for switching connection of sub power storage devices is being performed. Consequently, variation of the vehicle driving power that can be output, due to the process for starting and stopping the engine, can be avoided, so that the process for switching connection can be prevented from adversely affecting the vehicle's drivability.

Preferably, the switching control device further includes a step-up-voltage instruction unit, a first electric power limiter unit, a connection switching control unit, and a second electric power limiter unit. The step-up-voltage instruction unit is configured to instruct, when the request to switch is generated, the first voltage converter to cause a voltage on the electric power feeding line to be a first voltage higher than an output voltage of the main power storage device and an output voltage of a sub power storage device to be connected to the second voltage converter after switch has been made. The first electric power limiter unit is configured to gradually decrease an upper limit on electric power input and output to and from the selected sub power storage device to zero, after the voltage on the electric power feeding line has reached the first voltage. The connection switching control unit is configured to switch connection between the plurality of sub power storage devices and the second voltage converter, when the first electric power limiter unit has set the upper limit on electric power input and output to zero. The second voltage limiter unit is configured to gradually increase the upper limit on electric power input and output to a value corresponding to a state of charge of the sub power storage device newly connected to the second voltage converter after the connection switching control unit has switched connection between the plurality of sub power storage devices and the second voltage converter.

Preferably, the control method further includes the steps of: instructing the first voltage converter, when the request to switch is generated, to cause a voltage on the electric power feeding line to be a first voltage higher than an output voltage of the main power storage device and an output voltage of a sub power storage device to be connected to the second voltage converter after switch has made; gradually decreasing an upper limit on electric power input and output to and from the selected sub power storage device to zero, after the voltage on the electric power feeding line has reached the first voltage; switching connection between the plurality of sub power storage devices and the second voltage converter, when the upper limit on electric power input and output is set to zero by the step of gradually decreasing the upper limit; and gradually increasing the upper limit on electric power input and output to a value corresponding to a state of charge of the sub power storage device newly connected to the second voltage converter after the connection between the plurality of sub power storage devices and the second voltage converter has been switched by the step of switching.

In this way, when connection of the second voltage converter and the sub power storage device is to be switched, the voltage of the electric power feeding line is increased to the first voltage higher than the output voltage of the main power storage device and the output voltage of a sub power storage device to be newly used, and thereafter the newly used sub power storage device can be connected to the second voltage converter. Thus, a short circuit path can be prevented from being generated that extends from the newly used sub power storage device via the electric power feeding line. Further, the upper limit on electric power input and output of the sub power storage device is decreased before connection of the sub power storage device is switched, and the upper limit on electric power input and output is caused to gradually recover its original value after the connection has been switched. Therefore, while the electric power cannot be input and output to and from the sub power storage device because the connection is being switched, a request to excessive charging and discharging electric power can be prevented from being made to the power supply system.

Effects of the Invention

According to the present invention, for a hybrid vehicle having a power supply configured to include main and sub power storage devices and share a voltage converter (converter) by a plurality of power storage devices, the process for switching a sub power storage device can be prevented from adversely affecting the vehicle's drivability.

Figure 1:
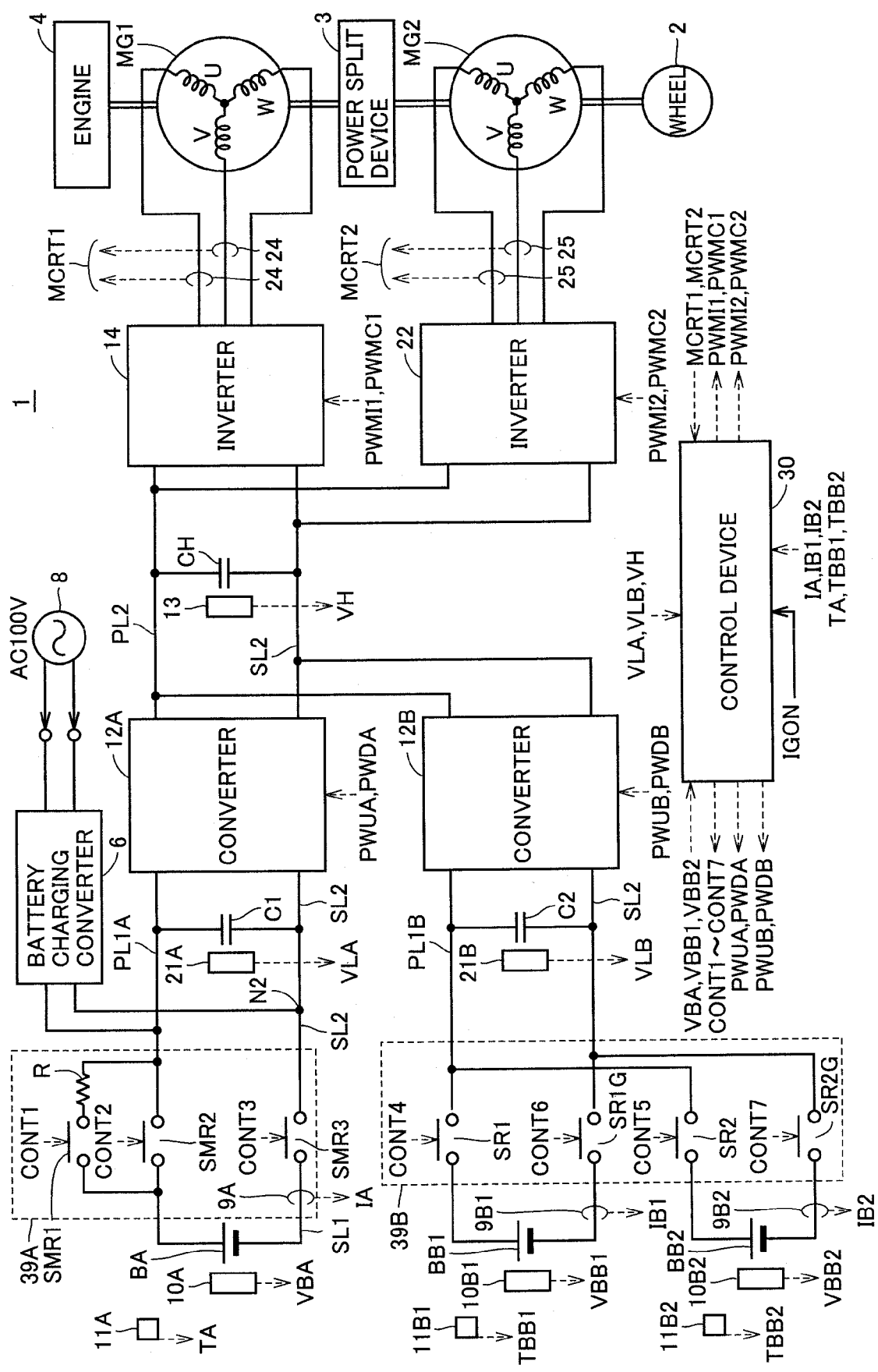
FIG. 1 shows a main configuration of a hybrid vehicle in an embodiment of the present invention.

DESCRIPTION OF THE REFERENCE SIGNS 1 hybrid vehicle; 2 wheel; 3 power split device; 4 engine; 6 battery charging converter (external charging); 8 external power supply; 9A, 9B1, 9B2 current sensor; 10A, 10B1, 10B2, 13, 21A, 21B voltage sensor; 11A, 11B1, 11B2 temperature sensor; 12A converter (dedicated to main power storage device); 12B converter (shared by sub power storage devices); 14, 22 inverter; 15-17 each phase arm (U, V, W); 24, 25 current sensor; 30 control device; 39A connection unit (for main power storage device); 39B connection unit (for sub power storage device); 100 switching determination unit; 110 step-up-voltage instruction unit; 120 electric power limiter unit (for main power storage device); 130 electric power limiter unit (for sub power storage device); 140 connection switching control unit; 200 converter control unit; 205 prohibit-starting-engine request generation unit; 210 battery switching prohibition unit; 215 protection control unit; 250 traveling control unit; 260 total power calculation unit; 270, 280 inverter control unit; BA battery (main power storage device); BB selected sub power storage device; BB1, BB2 battery (sub power storage device); C1, C2, CH smoothing capacitor; CMBT step up voltage command signal; CONT1-CONT7 relay control signal; D1-D8 diode; FBT flag (stepping up voltage completed); FINH prohibition flag (process for switching sub power storage device); IA, IB1, IB2 input/output current (battery); ID variable (status of switching process); IGON start signal; L1 reactor; MCRT1, MCRT2 motor current value; MG1, MG2 motor generator; PL1A, PL1B power supply line; PL2 electric power feeding line; Pttl total required power; PRT flag (for protecting component); PWMI, PWMI1, PWMI2, PWMC, PWMC1, PWMC2 control signal (for inverter); PWU, PWUA, PWDA, PWD, PWDA, PWDB control signal (for converter); RQES flag (to prohibit engine start/stop process); Q1-Q8 IGBT device; R limiting resistor; SL1, SL2 ground line; SMR1-SMR3 system main relay; SR1, SR1G, SR2, SR2G relay; STPEG flag (while engine stopping process is performed); STREG flag (while engine starting process is performed); TA, TBB1, TBB2 battery temperature (battery); Tqcom1, Tqcom2 torque command value; UL, VL, WL line (three-phase); V1 predetermined voltage; VBA, VBB1, VBB2 voltage (battery output voltage); VLA, VLB, VH voltage; VHref voltage command value (VH); Win upper limit on electric power input; Win(M) upper limit on electric power input (to main power storage device); Win(S) upper limit on electric power input (to selected sub power storage device); Wout upper limit on electric power output; Wout(M) upper limit on electric power output (from main power storage device); Wout(S) upper limit on electric power output (from selected sub power storage device)

BEST MODES FOR CARRYING OUT THE INVENTION

Embodiments of the present invention will be hereinafter described in detail with reference to the drawings. In the drawings, like or corresponding components are denoted by like reference characters, and a description thereof will not be repeated in principle.

FIG. 1 shows a main configuration of a hybrid vehicle in an embodiment of the present invention.

With reference to FIG. 1, a hybrid vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor generators MG1, MG2, a wheel 2, a power split device 3, an engine 4, and a control device 30.

The present embodiment provides a hybrid vehicle power supply system configured to include a main power storage device implemented as battery BA, electric power feeding line PL2 supplying electric power to inverter 14 driving motor generator MG2, converter 12A provided between the main power storage device (BA) and electric power feeding line PL2 to serve as a voltage converter converting voltage bidirectionally, batteries BB1, BB2 implementing a plurality of sub power storage devices provided in parallel with each other, and converter 12B provided between the plurality of sub power storage devices (BB1, BB2) and electric power feeding line PL2 to serve as a voltage converter converting voltage bidirectionally. The voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that for example when they are concurrently used they can output maximum power tolerated for an electric load (22 and MG2) connected to the electric power feeding line. This allows the vehicle without using the engine, i.e., traveling as an EV, to travel with maximum power. If the sub power storage device's state of charge is decreased, the sub power storage device can be exchanged so that the vehicle can further travel. If the sub power storage devices' electric power has completely been consumed, then, in addition to the main power storage device, the engine can be used to allow the vehicle to travel with maximum power without using the sub power storage device.

Furthermore, such a configuration allows converter 12B to be shared between the plurality of sub power storage devices. This can eliminate the necessity of increasing the number of converters to be equal to that of power storage devices. For a further increased EV travelable distance, an additional battery can be introduced in parallel with batteries BB1, BB2.

Preferably, the main power storage device and sub power storage devices mounted on this hybrid vehicle are externally chargeable. For this purpose, hybrid vehicle 1 further includes a battery charging device (charging converter) 6 to be connected to an external power supply 8 that is for example a commercial power supply of AC 100 V. Battery charging device 6 converts alternating current to direct current and also adjusts voltage to supply electric power for charging a battery. The configuration that enables external charging may be the above-described one, or a system connecting a neutral point of a stator coil of motor generator MG1, MG2 to an AC power supply or a system using converters 12A, 12B that function together as an AC to DC conversion device may also be used to enable external charging.

Smoothing capacitor C1 is connected between a power supply line PL1A and a ground line SL2. Voltage sensor 21A senses voltage VLA across smoothing capacitor C1 and outputs it to control device 30. Converter 12A can step up voltage across smoothing capacitor C1 and supply it to electric power feeding line PL2.

Smoothing capacitor C2 is connected between a power supply line PL1B and ground line SL2. Voltage sensor 21B senses voltage VLB across smoothing capacitor C2 and outputs it to control device 30. Converter 12B can step up voltage across smoothing capacitor C2 and supply it to electric power feeding line PL2.

Smoothing capacitor CH smoothes the voltage stepped up by converter 12A, 12B. Voltage sensor 13 senses voltage VH across smoothing capacitor CH and outputs it to control device 30.

Alternatively, in an opposite direction, converters 12A, 12B can step down voltage VH smoothed by smoothing capacitor CH and supply it to power supply lines PL1A, PL1B.

Inverter 14 receives DC voltage from converter 12B and/or 12A, converts it to three-phase AC voltage, and outputs it to motor generator MG1. Inverter 22 receives DC voltage supplied from converter 12B and/or 12A, converts it to three-phase AC voltage, and outputs it to motor generator MG2.

Power split device 3 is a mechanism coupled to engine 4 and motor generators MG1, MG2 to distribute power therebetween. The power split device can for example be a planetary gear mechanism having the three shafts of rotation of a sun gear, a planetary carrier and a ring gear. In the planetary gear mechanism, when two of the three shafts of rotation have their rotation determined, that of the other one shaft of rotation is compulsively determined. These three shafts of rotation are connected to engine 4 and motor generators MG1, MG2 at their respective shafts of rotation, respectively. Motor generator MG2 has its shaft of rotation coupled to wheel 2 by a reduction gear, a differential gear or the like (not shown). Furthermore, power split device 3 may further have a speed reducer incorporated therein for the shaft of rotation of motor generator MG2. In other words, variation of the engine's output not only varies the engine's speed but also acts through the variation of the engine's speed to vary the speed of a rotary element (MG1, MG2 and the like) coupled to power split device 3.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (ground line SL1) and a node N2.

System main relays SMR1 to SMR3 have their conduction (on)/non-conduction (off) states controlled by relay control signals CONT1 to CONT3, respectively, issued from control device 30.

Voltage sensor 10A measures voltage VA across battery BA. Further, temperature sensor 11A measures temperature TA of battery BA, and current sensor 9A measures current IA input/output to/from battery BA. The measurements obtained by these sensors are output to control device 30. Based on these measurements, control device 30 monitors the state of battery BA represented by the state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction (on)/non-conduction (off) states controlled by relay control signals CONT4, CONT5, respectively, issued from control device 30. Relays SR1G, SR2G have their conduction (on)/non-conduction (off) states controlled by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by the state of charge (SOC).

Battery BA, BB1, BB2 can for example be a lead-acid battery, a nickel-metal hydride battery, a lithium ion battery or a similar secondary battery, an electric double layer capacitor or a similar large-capacitance capacitor, or the like.

Inverter 14 is connected to electric power feeding line PL2 and ground line SL2. Inverter 14 receives the stepped-up voltage from converter 12A and/or converter 12B, and drives motor generator MG1 for example to start engine 4. Furthermore, inverter 14 returns to converters 12A and 12B the electric power generated by motor generator MG1 by the power transmitted from engine 4. At this time, converters 12A and 12B are controlled by control device 30 to operate as voltage step down converters.

Current sensor 24 senses a current that flows to motor generator MG1 as a motor current value MCRT1, and outputs motor current value MCRT1 to control device 30.

Inverter 22 is connected to electric power feeding line PL2 and ground line SL2 in parallel with inverter 14. Inverter 22 receives DC voltage from converters 12A and 12B, converts it to three-phase AC voltage, and outputs it to motor generator MG2 for driving wheel 2. Furthermore, inverter 22 returns to converters 12A and 12B the electric power generated by motor generator MG2 as the vehicle is regeneratively braked. At this time, converters 12A and 12B are controlled by control device 30 to operate as voltage step down converters.

Current sensor 25 senses a current that flows to motor generator MG2 as a motor current value MCRT2, and outputs motor current value MCRT2 to control device 30.

Control device 30 is constituted by an electronic control unit (ECU) having a central processing unit (CPU) and a memory (not shown) incorporated therein, and in accordance with a map and a program stored in the memory, uses each sensor's measurement to perform an operation process. Control device 30 may have a portion configured to allow an electronic circuit or similar hardware to perform predetermined arithmetic and logical operations.

More specifically, control device 30 receives torque command values for motor generators MG1, MG2, respectively, the motor generators' respective rotation speeds, respective values of voltages VBA, VBB1, VBB2, VLA, VLB, VH, motor current values MCRT1, MCRT2, and a start signal IGON. Control device 30 then outputs to converter 12B a control signal PWUB for instructing the converter to step up voltage, a control signal PWDB for instructing the converter to step down voltage, and a shutdown signal for giving an instruction for prohibiting operation.

Furthermore, control device 30 outputs to inverter 14 a control signal PWMI1 for instructing inverter 14 to convert DC voltage output from converters 12A, 12B to AC voltage for driving motor generator MG1, and a control signal PWMC1 for instructing inverter 14 to convert AC voltage generated by motor generator MG1 to DC voltage and return it toward converters 12A, 12B for regeneration.

Similarly, control device 30 outputs to inverter 22 a control signal PWMI2 for instructing inverter 22 to convert DC voltage to AC voltage for driving motor generator MG2, and a control signal PWMC2 for instructing inverter 22 to convert AC voltage generated by motor generator MG2 to DC voltage and return it toward converters 12A, 12B for regeneration.

Figure 2:
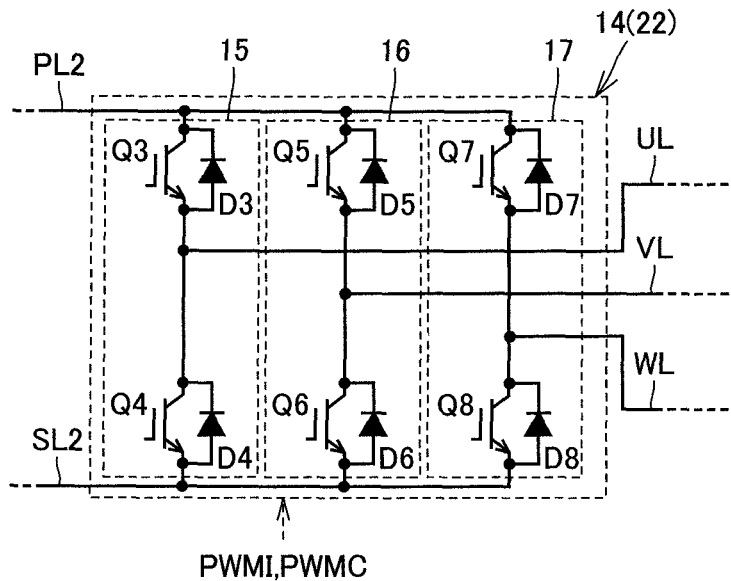
FIG. 2 is a circuit diagram showing in detail a configuration of each inverter shown in FIG. 1.

FIG. 2 is a circuit diagram showing in detail a configuration of inverters 14 and 22 shown in FIG. 1.

With reference to FIG. 2, inverter 14 includes a U phase arm 15, a V phase arm 16 and a W phase arm 17. U phase arm 15, V phase arm 16 and W phase arm 17 are connected in parallel between electric power feeding line PL2 and ground line SL2.

U phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as done in U phase arm 15.

W phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as done in U phase arm 15.

In the present embodiment, an IGBT device is indicated as a representative example of a power semiconductor switching element controllable to be turned on/off. In other words, it is also replaceable with a bipolar transistor, a field effect transistor or a similar power semiconductor switching element.

Each phase arm has an intermediate point connected to motor generator MG1 at each phase coil at each phase end. In other words, motor generator MG1 is a three-phase permanent magnet synchronous motor and the three U, V, W phase coils each have one end connected together to an intermediate point. The U phase coil has the other end connected to a line UL drawn from a connection node of IGBT devices Q3, Q4. The V phase coil has the other end connected to a line VL drawn from a connection node of IGBT devices Q5, Q6. The W phase coil has the other end connected to a line WL drawn from a connection node of IGBT devices Q7, Q8.

Inverter 22 shown in FIG. 1 is different in that it is connected to motor generator MG2. However, its internal circuit configuration is similar to inverter 14. Accordingly it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
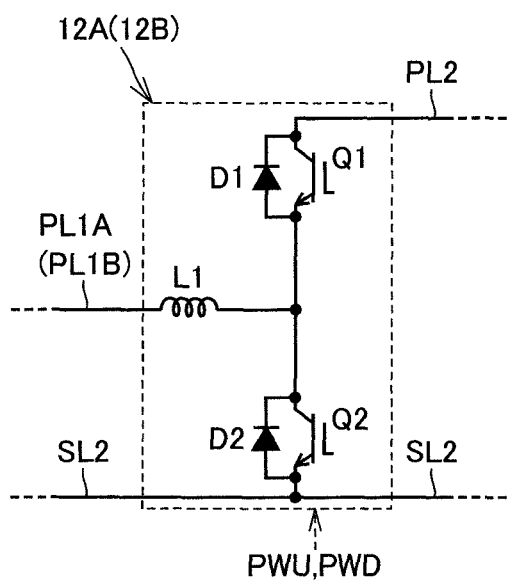
FIG. 3 is a circuit diagram showing in detail a configuration of each converter shown in FIG. 1.

FIG. 3 is a circuit diagram showing in detail a configuration of converters 12A and 12B shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter. Diode D2 has its cathode connected to IGBT device Q2 at the collector and its anode to IGBT device Q2 at the emitter.

Converter 12B shown in FIG. 1 is different from converter 12A in that the former is not connected to power supply line PL1A and instead to power supply line PL1B. Its internal circuit configuration is, however, similar to converter 12A, and therefore, a detailed description thereof will not be repeated. Further, FIG. 3 shows the converter receiving control signals PWU, PWD, which is for the sake of avoiding complexity. Specifically, as shown in FIG. 1, different control signals PWUA, PWDA and control signals PWUB, PWDB are input to inverters 14 and 22, respectively.

In the power supply system of hybrid vehicle 1, battery BA (main power storage device) and a sub power storage device selected from batteries BB1, BB2 (hereinafter also referred to as "selected sub power storage device BB") are used to provide and receive electric power to and from motor generators MG1, MG2.

Control device 30 receives sensed values from voltage sensor 10A, temperature sensor 11A and current sensor 9A, and in accordance therewith sets an SOC(M) indicating the main power storage device's residual capacity, an upper limit on electric power input Win(M) indicating an upper limit value of electric power to be charged thereto, and an upper limit on electric power output Wout(M) indicating an upper limit value of electric power to be discharged therefrom.

Furthermore, control device 30 receives sensed values from voltage sensors 10B1, 10B2, temperature sensors 11B1, 11B2 and current sensors 9B1, 9B2 and in accordance therewith sets an SOC(B) of selected sub power storage device BB and upper limits on electric power input and output Win(S) and Wout(S) thereto and therefrom, respectively.

Generally, an SOC is indicated by a ratio (%) of each battery's currently charged amount to its fully charged state. Furthermore, Win, Wout are indicated as such an upper limit value of electric power that, when that electric power of the upper limit value is discharged for a predetermined period of time (for approximately 10 seconds for example), the battery of interest (BA, BB1, BB2) is not overcharged/overdischarged.

Figure 4:
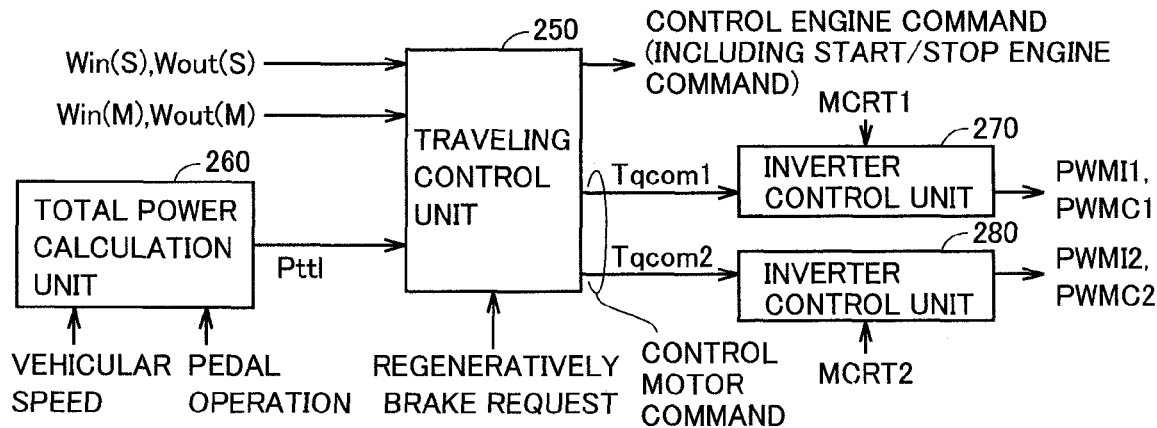
FIG. 4 is a functional block diagram for illustrating how traveling of a hybrid vehicle is controlled.

FIG. 4 is a functional block diagram for illustrating how control device 30 controls traveling of hybrid vehicle 1, more specifically, a configuration for power distribution control between engine 4 and motor generators MG1, MG2. FIG. 4 shows functional blocks that are implemented by control device 30 through execution of a predetermined program stored in advance and/or operation performed by electronic circuitry (hardware) in control device 30.

With reference to FIG. 4, a total power calculation unit 260 calculates total power Pttl required for the entirety of hybrid vehicle 1 from vehicular speed and operation of a pedal (accelerator pedal). Total required power Pttl may also include power required (engine's output), depending on the vehicle's condition, for generating electric power by motor generator MG1 to charge a battery.

A traveling control unit 250 receives the upper limits on electric power input and output Win(M) and Wout(M) to and from main power storage device BA, the upper limits on electric power input and output Win(S) and Wout(S) to and from a selected sub power storage device BB, total required power Pttl from total power calculation unit 260, and a regenerative brake request made when the brake pedal is operated. Traveling control unit 250 generates torque command values Tqcom1 and Tqcom2 as motor control commands, so that the total input and output electric power of motor generators MG1 and MG2 falls within the total charging limit (Win(M)+

Win(S)) and the total discharging limit (Wout(M)+Wout(S)) for main power storage device BA and selected sub power storage device BB. Furthermore, to ensure total required power Pttl, it is assigned between power provided by motor generator MG2 to drive the vehicle and that provided by engine 4 to do so. In particular, an externally charged battery's electric power is maximally utilized to restrict the operation of engine 4, or the power provided by engine 4 to drive the vehicle is set to correspond to a range allowing engine 4 to be highly efficiently operable, so that the vehicle is controlled to travel with high fuel-efficiency.

An inverter control unit 270 receives torque command value Tqcom1 and motor current value MCRT1 of motor generator MG1 and therefrom generates control signals PWMI1, PWMC1 for inverter 14. Similarly an inverter control unit 280 receives torque command value Tqcom2 and motor current value MCRT2 of motor generator MG2 and therefrom generates control signals PWMI2, PWMC2 for inverter 22. Furthermore, traveling control unit 250 generates a control engine command in accordance with a value requested of power provided by the engine to drive the vehicle, as set. Furthermore, a control device (engine ECU) (not shown) controls the operation of engine 4 in accordance with the control engine command.

When hybrid vehicle 1 actively uses battery's electric power to travel (i.e., in an EV mode), and total required power Pttl is equal to or smaller than the batteries' total upper limit on electric power output Wout(M)+Wout(S), engine 4 is not operated and motor generator MG2 alone provides power to drive the vehicle to travel. When total required power Pttl exceeds Wout(M)+Wout(S), engine 4 is started.

In contrast, when the EV mode is not selected, i.e., in an HV mode, distribution of driving power between engine 4 and motor generator MG2 is controlled to maintain the batteries' SOC at a predetermined target value. In other words, the vehicle is controlled to travel with engine 4 more actuatable than in the EV mode.

When engine 4 is stopped and it is necessary to start it in accordance with such driving power distribution control as described above, traveling control unit 250 generates a request to start engine 4. In response to the request, a start engine command is generated, and motor generator MG1 is controlled to generate a torque for cranking engine 4 (torque for positive rotation). In other words, an engine starting process requires that the power supply system supplies electric power consumed by motor generator MG1 to generate the cranking torque.

Similarly, when engine 4 is in operation and it is necessary to stop it in accordance with such driving power distribution control as described above, traveling control unit 250 generates a stop engine request. In response to this request, a stop engine command is generated, and in response, supplying fuel to engine 4 is stopped (or fuel is cut), and to reduce/prevent vibration, after fuel is cut, motor generator MG1 is driven to control speed reduction, use regenerative braking immediately before the engine stops. In an engine stopping process, the power supply system receives/outputs electric power for the above motor driving and regenerative braking, and the like.

Hybrid vehicle 1 has engine 4 and motor generators MG1, MG2 coupled via power split device 3, and accordingly, when a rotary element, for example, engine 4 or motor generator MG1, coupled to power split device 3 rotates at an excessively increased speed, a start or stop engine request may be generated to reduce/prevent that excessively increased speed to protect components. For example, this corresponds to: stopping engine 4 to remove the engine's output torque so that motor generator MG1 and engine 4 rotate at a reduced speed; starting engine 4 to suppress a negative speed of rotation of motor generator MG1; and the like.

In the EV mode, charging and discharging are controlled to preferentially use the electric power of selected sub power storage device BB rather than that of main power storage device BA. As such, when the vehicle is traveling and the SOC of selected sub power storage device BB as currently used decreases, selected sub power storage device BB needs to be switched. For example, when battery BB1 is used as a selected sub power storage device BB in starting the vehicle, a necessity will arise to subsequently disconnect battery BB1 from converter 12B and connect battery BB2 as a now selected sub power storage device BB to converter 12B, i.e., to perform a connection switching process.

Here, while the connection switching process for switching the selected sub power storage device is performed, it is only main power storage device BA that is available, and accordingly the electric power that can be input/output to/from the power supply system as a whole decreases. Further, as described above, the engine starting/stopping process involves input/output of electric power to/from the power supply system. As such, when the connection switching process for switching the selected sub power storage device and the process for starting/stopping the engine are performed in overlapping periods, the power that can be generated by the vehicle as a whole for driving the vehicle cannot be ensured temporarily, due to the influence of the electric power required for the process for starting/stopping the engine, which may affect the vehicle's drivability.

As such, it is necessary to determine when the engine starting/stopping process and the connection switching process for switching the selected sub power storage device should be performed, so that the connection switching process for switching the selected sub power storage device will not affect the vehicle's drivability.

Moreover, the connection switching process for switching the selected sub power storage device may cause an unintended short circuit path to be generated due to connection of a new high-voltage battery, and thus another problem of device protection or the like may arise. It is therefore necessary to sufficiently take care not to cause a short circuit path to be generated. Further, while the above-described connection switching process is performed, electric power cannot be supplied and recovered by selected sub power storage device BB. It is therefore required to restrict charging and discharging so that overcharging and overdischarging of the power supply system as a whole will not occur while the connection switching process is performed.

Figure 5:
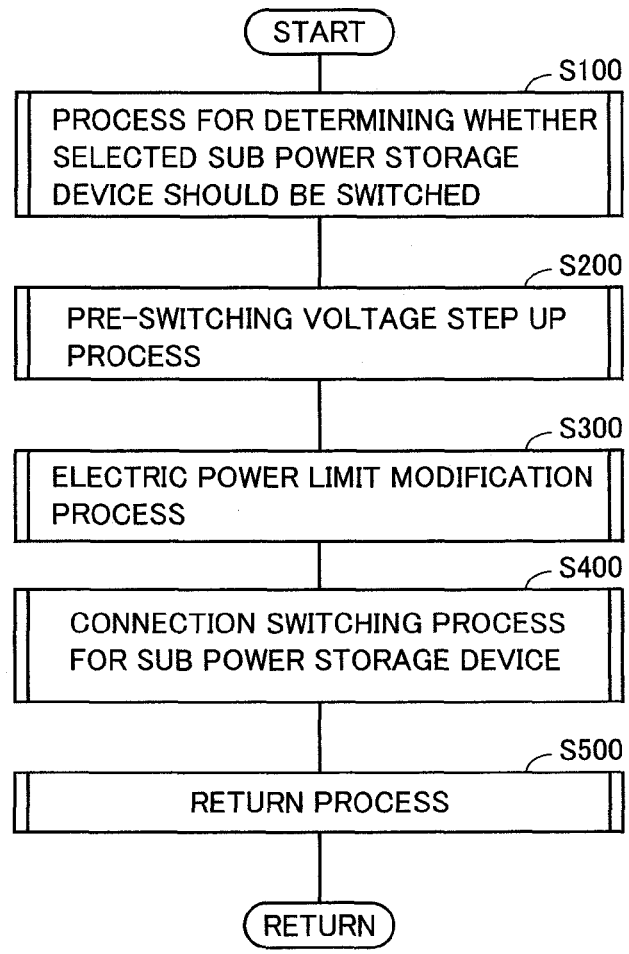
FIG. 5 is a flowchart showing a general procedure of a process performed to switch connection of a selected sub power storage device in a hybrid vehicle in an embodiment of the present invention.

FIG. 5 shows a flowchart of a general procedure of a process for switching a selected sub power storage device in a power supply system of a hybrid vehicle in an embodiment of the present invention. FIGS. 6 to 10 show flowcharts for specifically illustrating steps S100, S200, S300, S400, and S500 of FIG. 5.

Control device 30 can execute a previously stored, predetermined program periodically, as predetermined, to repeatedly perform a control process procedure in accordance with the flowchart indicated in FIGS. 5 to 10, periodically as predetermined. In this way, the connection switching process can be implemented for switching a sub power storage device in a power supply system of a hybrid vehicle in an embodiment of the present invention.

With reference to FIG. 5, control device 30 performs in step S100 a process for determining whether a selected sub power storage device should be switched. When control device 30 determines that it is necessary to switch the selected sub power storage device, the following steps S200 to S500 are performed. When control device 30 determines in step S100 that it is not necessary to switch the selected sub power storage device, steps S200 to S500 are substantially not performed.

Control device 30 performs in step S200 a pre-switching voltage step up process and performs in step S300 an electric power limit modification process so that a request is not generated to the power supply system to excessively charge/discharge while the sub power storage device is being switched. Then, control device 30 performs in step S400 a connection switching process for actually switching connection of selected sub power storage device BB and converter 12B. After this process has been completed, a return process is performed in step S500, and newly selected sub power storage device BB starts supplying electric power.

Figure 6:
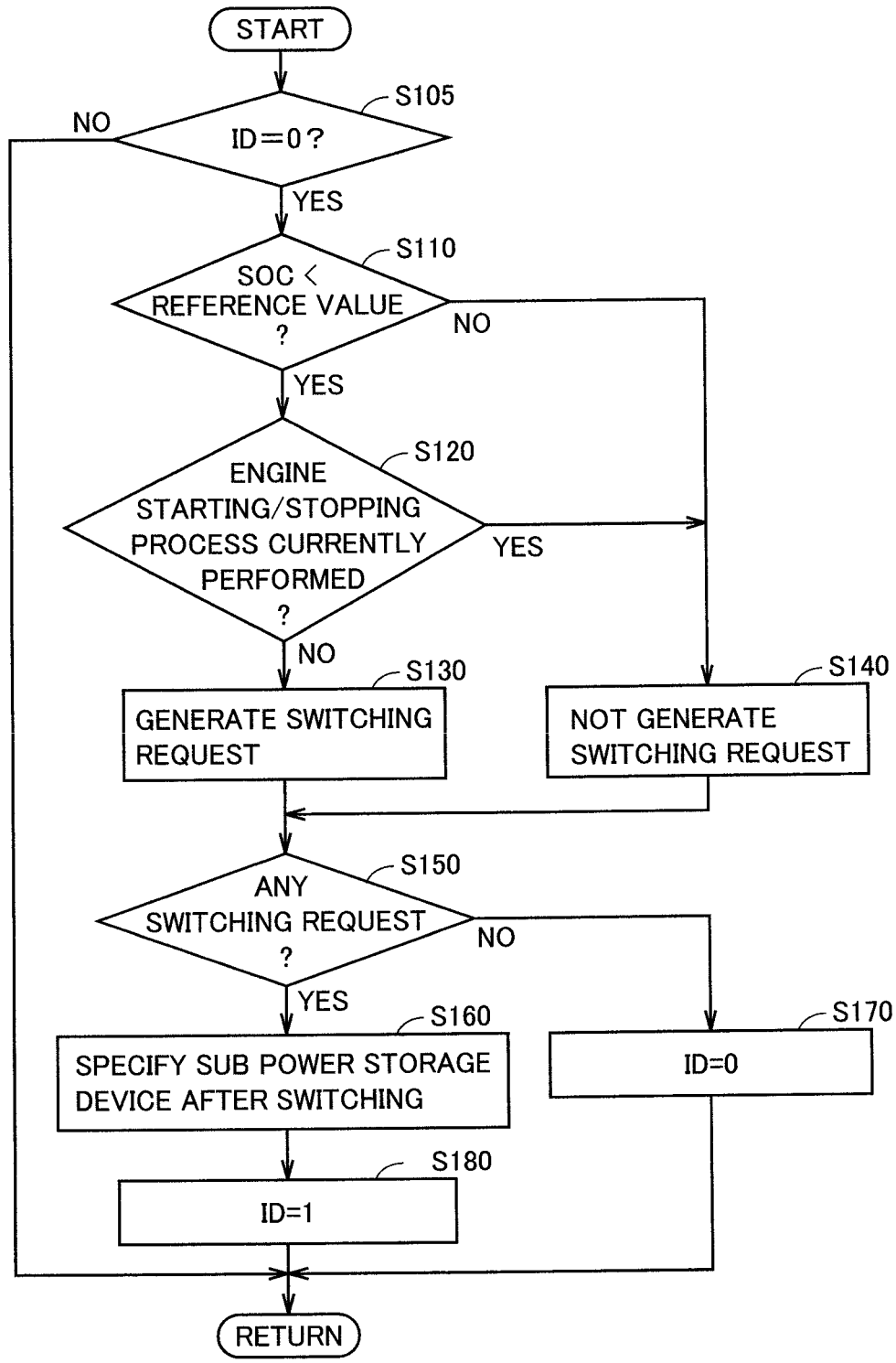
FIG. 6 is a flowchart for illustrating in detail a process performed to determine whether a sub power storage device should be switched as shown in FIG. 5.

FIG. 6 is a flowchart for illustrating in detail the process performed to determine whether a selected sub power storage device should be switched (S100) as shown in FIG. 5.

As will be described hereinafter, a variable ID representing the progress (status) of the connection switching process is introduced. ID is set to any of −1 and 0 to 4. ID=0 represents a status where a request to switch the sub power storage device has not been made. Namely, when the variable is ID=0, selected sub power storage device BB as currently selected supplies electric power, while it is determined periodically as predetermined whether selected sub power storage device BB should be switched. In the case where there is no available sub power storage device due to device failure or due to the fact that the battery electric power has been exhausted, the variable is set to ID=−1.

With reference to FIG. 6, control device 30 determines in step S105 whether the variable is ID=0. When the variable is ID=0 (YES in S105), control device 30 starts the process for determining whether switch should be made substantially.

Initially, control device 30 determines in step S110 whether it is necessary to make a request to switch, based on the state of charge (SOC) of selected sub power storage device BB. For example, the SOC of selected sub power storage device BB is compared with a predetermined reference value and, when the SOC falls below the reference value, the determination made in step S110 is YES.

When the determination made in step S110 is YES, control device 30 proceeds to step S120 to determine whether a process is currently performed for stopping or starting engine 4. For example, this process can be performed based on a flag (STREG in FIG. 14) that is set ON from the time when a start engine command is generated to the time when the engine's speed increases to attain a predetermined value, or based on a flag (STPEG in FIG. 14) that is set ON from the time when a stop engine command is generated to the time when the engine stops (engine speed=0).

Furthermore, when the determination in step S120 is NO, namely the SOC of selected sub power storage device BB falls below the reference value and neither the engine starting process nor the engine stopping process is performed, then control device 30 proceeds to step S130 to generate a request to switch selected sub power storage device BB.

In contrast, even if the SOC falls (YES in S110), control device 30 proceeds to step S140 where control device 30 does not generate the request to switch, as long as the process for stopping the engine or the process for starting the engine is being performed (YES in S120).

When selected sub power storage device BB has an SOC equal to or larger than the reference value (NO in S110), control device 30 also proceeds to step S140 and does not generate the request to switch.

Control device 30 confirms in step S150 whether the request to switch has been made. When the request to switch has been made (YES in S150), control device 30 specifies in step S160 another selected sub power storage device BB to be used. In the case as shown in FIG. 1 where two batteries BB1, BB2 are provided as sub power storage devices, another selected sub power storage device BB is automatically determined before performing step S160. In the case where three or more sub power storage devices BB1 to BBn (n: integer of 3 or greater) are provided in the configuration of FIG. 1, another sub power storage device to be used next is specified based on respective SOCs or the like of the sub power storage devices that are not currently used. Control device 30 then sets the variable to ID=1 to further continue the connection switching process. Namely, ID=1 represents a state where the request to switch selected sub power storage device BB is made and the switching process is started.

In contrast, when it is determined in step S110 that switching of the selected sub power storage device is unnecessary (NO in S150), control device 30 maintains ID=0 in step S170 to end the process for determining whether switching should be made. Consequently in the subsequent and following control cycles, when the determination in step S105 is YES, the above-described process for determining whether the device should be switched will be performed again. Thus, when there is a relation of SOC<reference value, while the process for stopping or starting engine 4 is performed, the request to switch will not be made until this process is ended.

Once the variable has been set to ID≥1 and the switching process has been started, or when the variable is set to ID=−1 because there is no available sub power storage device (NO in S105), steps S110 to S180 are skipped.

Figure 7:
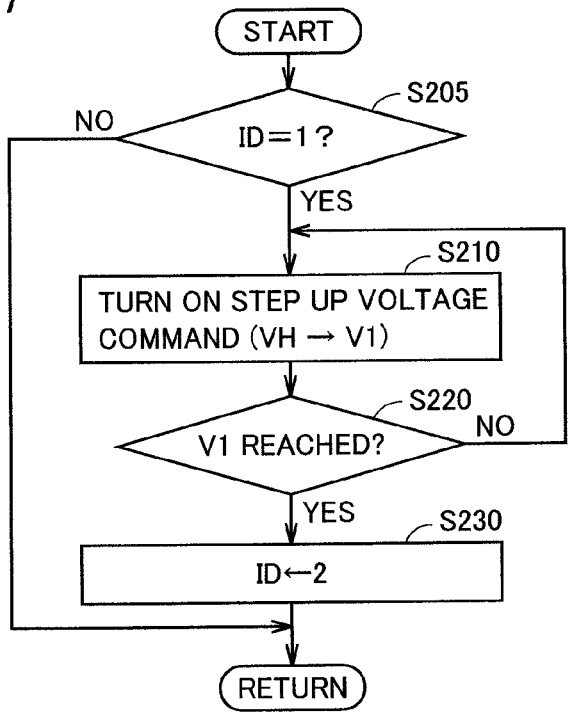
FIG. 7 is a flowchart for illustrating in detail a pre-switching voltage step up process shown in FIG. 5.

FIG. 7 is a flowchart for illustrating in detail the pre-switching voltage step up process (S200) shown in FIG. 5.

With reference to FIG. 7, control device 30 in the pre-switching voltage step up process confirms whether the variable is ID=1 in step S205. When the variable is ID=1 and the request to switch selected sub power storage device BB is made to start the switching process (YES in S205), control device 30 proceeds to step S210 to generate a command to converter 12A to step up voltage VH on electric power feeding line PL2 to a predetermined voltage V1. In response to the step up voltage command, a voltage command value VHref for electric power feeding line PL2 is set to be equal to V1, and to implement this voltage command value, control signal PWUA for converter 12A is generated.

Here, predetermined voltage V1 is set to a voltage higher than the higher one of the output voltage of main power storage device BA and the output voltage of selected sub power storage device BB (BB2 for example) to be newly connected. For example, predetermined voltage V1 is set to an upper limit control voltage VHmax to which the voltage can be stepped up by converter 12A to accordingly ensure that voltage VH when a step up voltage command is issued is higher than both of respective output voltages of main power storage device BA and selected sub power storage device BB as newly connected. Alternatively, in view of reducing a loss caused at converter 12A, predetermined voltage V1 may be determined, as occasion demands, to have a margin relative to respective output voltages of main power storage device BA and newly-connected selected sub power storage device BB at the time.

When the step up voltage command is generated in step S210, control device 30 proceeds to step S220 to determine from a value as sensed by voltage sensor 13 whether voltage VH has reached predetermined voltage V1. The determination in step S220 is YES for example when VH≥V1 continues for a predetermined period of time.

Once voltage VH has reached predetermined voltage V1 (YES in S220), control device 30 changes ID from 1 to 2. Until voltage VH reaches V1 (NO in S220), ID=1 is maintained. In other words, ID=2 represents a status where the pre-switching voltage step up process has ended and the switching process can be further continued. When the variable is ID≠1 (NO in S205), the subsequent steps S210 to S230 are skipped.

Figure 8:
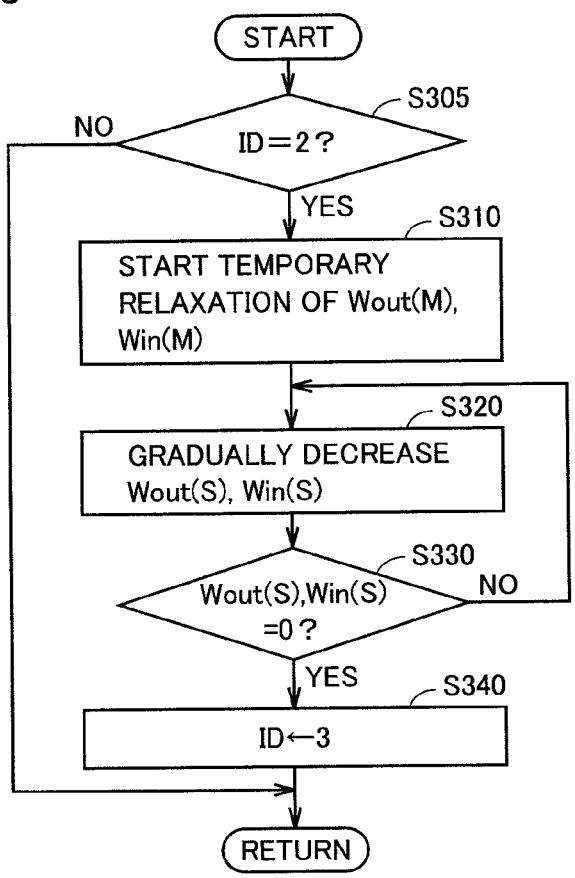
FIG. 8 is a flowchart for illustrating in detail an electric power limit modification process shown in FIG. 5.

Thus when the pre-switching voltage step up process (step S200) ends, control device 30 performs the electric power limit modification process as shown in FIG. 8.

FIG. 8 is a flowchart for illustrating in detail the electric power limit modification process (S300) shown in FIG. 5.

With reference to FIG. 8, control device 30 in the electric power limit modification process initially proceeds to step S305 to determine whether the variable is ID=2. If not, (NO in S305), the subsequent steps S310 to 340 are skipped.

When the variable is ID=2 (YES in S305), control device 30 proceeds to step S310 to start temporary relaxation of the restriction on charging and discharging of main power storage device BA. Specifically, respective absolute values of the upper limits on electric power input and output Win(M) and Wout(M) of main power storage device BA are temporarily increased.

Further, control device 30 proceeds to step S320 to gradually decrease the absolute values of the upper limits on electric power input and output Win(S) and Wout(S) of selected sub power storage device BB. For example, Wout(S) and Win(S) are decreased gradually toward 0 a predetermined fixed rate.

Control device 30 proceeds to step S330 to determine whether Wout(S) and Win(S) have reached 0. Until a relation of Wout(S)=Win(S)=0 holds, step S320 is repeated to continuously decrease Wout(S) and Win(S).

Once Wout(S) and Win(S) have reached 0 (YES in S330), control device 30 proceeds to step S340 to change ID from 2 to 3. In other words, ID=3 represents a status where the pre-switching voltage step up process and the electric power limit modification process have ended and switching of the connection between sub power storage devices BB1, BB2 and converter 12B can be started.

When the electric power limit modification process shown in FIG. 8 ends, control device 30 proceeds to step S400 to perform the connection switching process for the sub power storage device.

Figure 9:
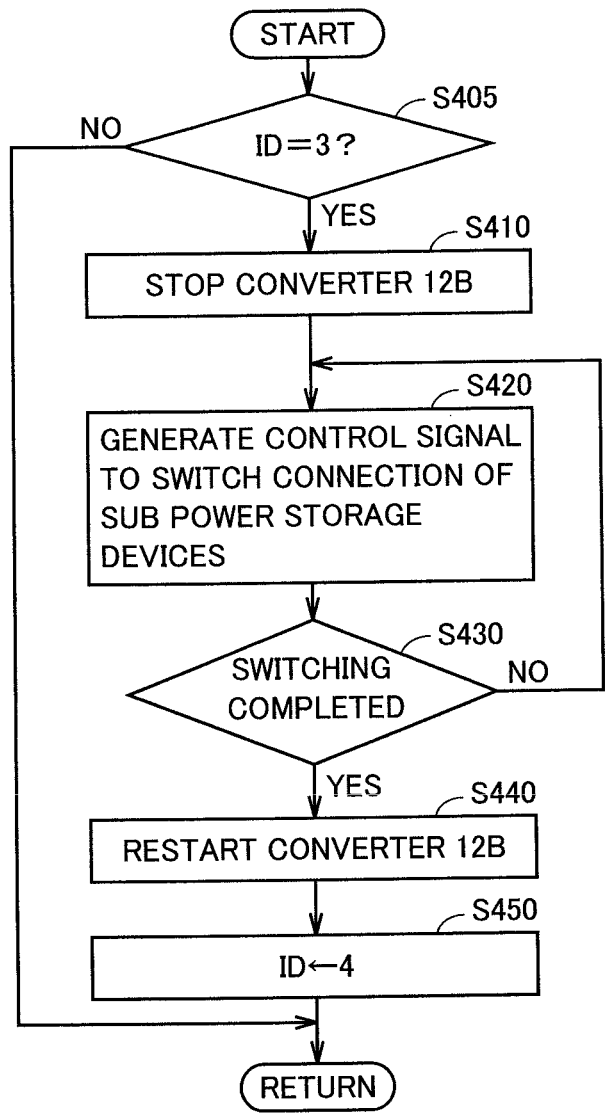
FIG. 9 is a flowchart for illustrating in detail a connection switching process as shown in FIG. 5.

FIG. 9 is a flowchart for illustrating in detail the connection switching process for a sub power storage device (S400) as shown in FIG. 5.

With reference to FIG. 9, control device 30 in the connection switching process for a sub power storage device initially proceeds to step S405 to determine whether the variable is ID=3. When the variable is ID≠3 (NO in S405), the following steps S410 to S450 are skipped.

When the variable is ID=3 (YES in S405), control device 30 proceeds to step S410 to stop converter 12B in preparation for switching connection of the sub power storage device. More specifically, in converter 12B, IGBT devices Q1, Q2 are forced to turn off in response to a shutdown command, and in that condition, control device 30 proceeds to step S420 to generate a relay control signal for actually switching connection of the sub power storage device. For example, relay control signals CONT4, CONT6 are generated so that relays SR1, SR1G are turned off while relay control signals CONT5 and CONT7 are generated so that relays SR2, SR2G are turned on, in order to disconnect battery BB1 from converter 12B and connect battery BB2 to converter 12B.

Furthermore, control device 30 proceeds to step S430 to determine whether switching of the relay connections in step S420 has been completed. When the switching of the connections has been completed (YES in S430), control device 30 proceeds to step S440 to restart converter 12B for starting the switching operation and to step S450 to change variable ID from 3 to 4.

Namely, ID=4 represents a status where switching of the connection between the sub power storage device and converter 12B by means of the relays has been completed.

When the connection switching process in step S400 ends, control device 30 performs the return process in step S500.

Figure 10:
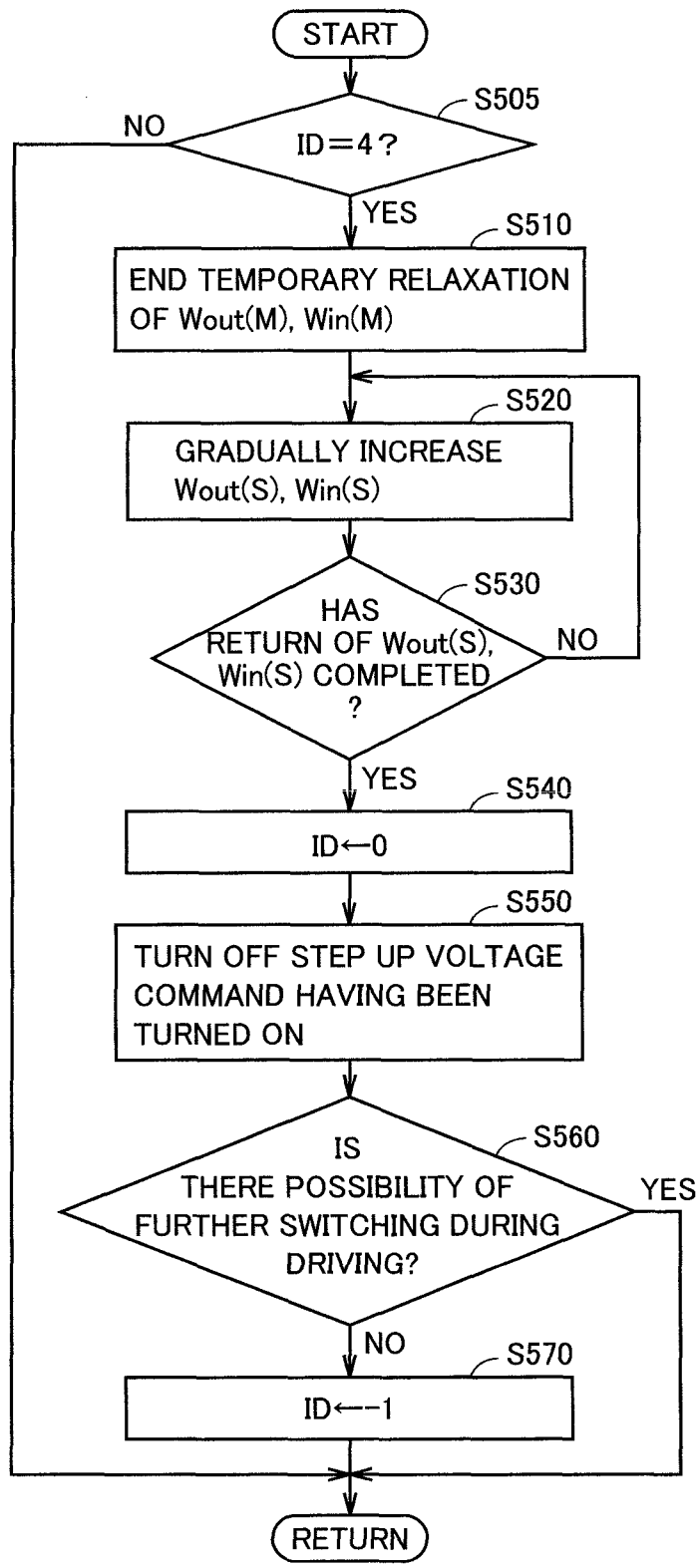
FIG. 10 is a flowchart for illustrating in detail a return process shown in FIG. 5.

FIG. 10 is a flowchart for illustrating in detail the return process (S500) shown in FIG. 5.

With reference to FIG. 10, control device 30 in the return process initially determines in step S505 whether the variable is ID=4. When the variable is ID≠4 (NO in S505), the following steps S510 to S570 are skipped.

When the variable is ID=4 (YES in S505), control device 30 ends in step S510 the temporary relaxation of the restriction on charging and discharging of main power storage device BA as started in step S310 (FIG. 7). Accordingly, Wout(M) and Win(M) basically recover respective values before the process for switching selected sub power storage device BB is started.

Further, control device 30 gradually increases the upper limits on electric power input and output Win(S) and Wout(S) of selected sub power storage device BB that have been decreased to zero in the electric power limit process (step S300), to respective values of Win and Wout of the newly selected sub power storage device (battery BB2 for example).

Then, control device 300 confirms in step S530 whether the upper limits on electric power input and output Win(S) and Wout(S) recover respective values of Win and Wout of newly selected sub power storage device BB. Before the return process is completed (NO in S530), step S520 is repeatedly performed so that the upper limits on electric power input and output Win(S) and Wout(S) gradually increase at a fixed rate.

When the upper limits on electric power input and output Win(S) and Wout(S) have recovered respective values (YES in S530), control device 30 causes ID to be 0 again in step S540. Accordingly, a state in which electric power can be supplied and recovered normally by main power storage device BA and newly selected sub power storage device BB is reproduced in the power supply system.

Further, control device 30 proceeds to step S550 to make the step up voltage command off that is generated in step S210 (FIG. 6). Accordingly, the voltage command value for electric power feeding line PL2 is also set to a normal value that is determined depending on the conditions of motor generators MG1, MG2.

When the series of steps in the switching process is completed, control device 30 may further determine in step S560 whether there is a possibility that the selected sub power storage device is further switched while the vehicle is traveling. When there is no possibility of further switching, control device 30 sets the variable to ID=−1 in step S570. When the variable is ID=−1, steps S100 to S500 in FIG. 4 are not performed substantially. Therefore, until driving of the vehicle is ended, the process for switching a sub power storage device will not be started.

In contrast, when there is a possibility of further switching, control device 30 skips step S570 and keeps ID=0. The process for determining whether switch should be made in step S100 is thus performed periodically as predetermined and therefore, the process for switching a selected sub power storage device will be started again as required.

In the exemplary configuration of FIG. 1 where only two sub power storage devices are mounted, step S560 may be skipped and, once the process for switching a selected sub power storage device has been completed, the variable may be set to ID=−1 all the time, so that the process for switching a selected sub power storage device while the vehicle is being driven may be performed only once.

Alternatively, in the case where the power supply system includes three or more sub power storage devices or the power supply system is configured to be capable of charging a sub power storage which is not being used while the vehicle is being driven, ID=0 may be maintained depending on the condition, so that the second and subsequent processes for switching a selected sub power storage device can be performed.

Figure 11:
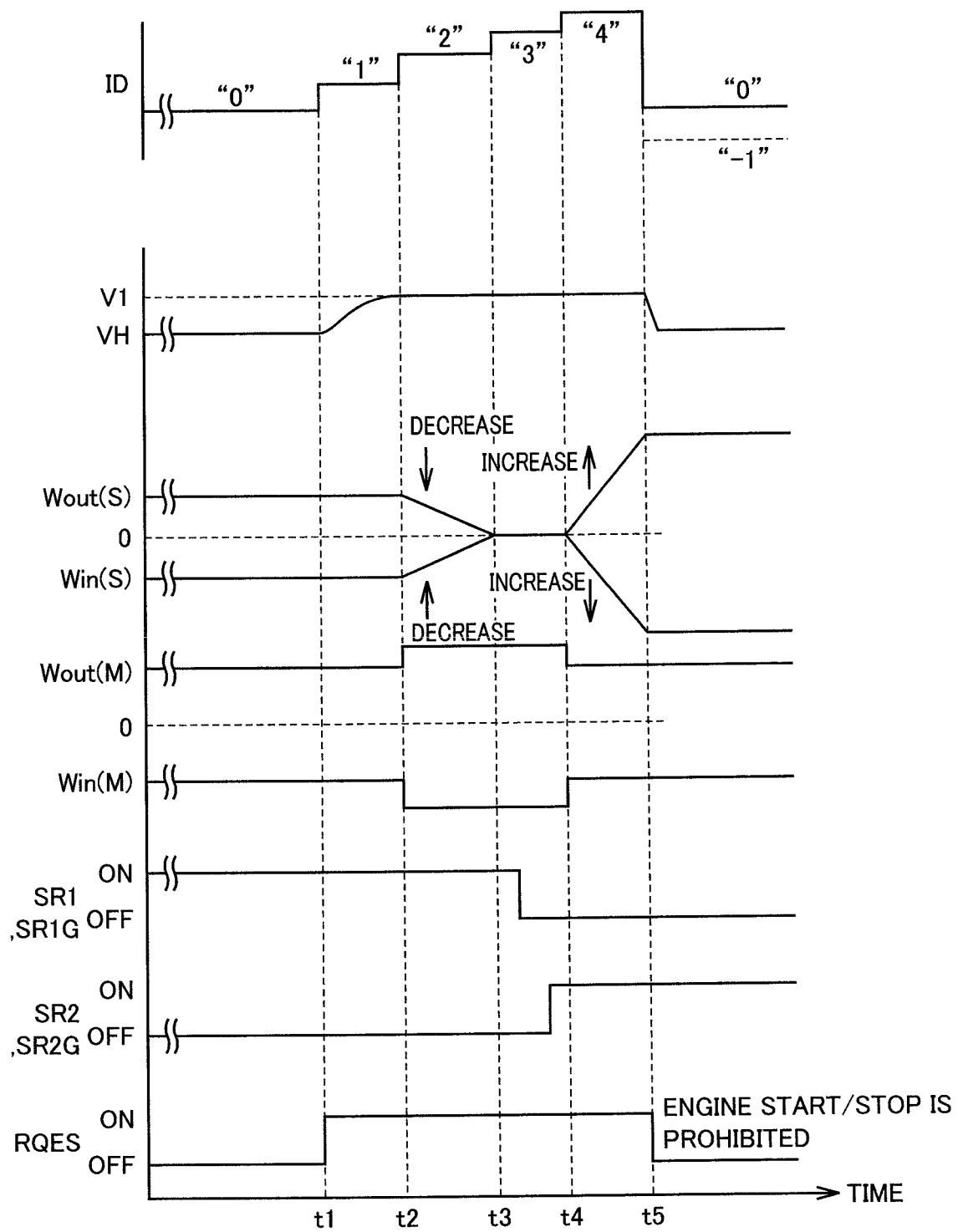
FIG. 11 is an operation waveform diagram for a process performed to switch a selected sub power storage device in a hybrid vehicle in an embodiment of the present invention.

FIG. 11 shows in waveform an operation performed in the process for switching a selected sub power storage device in the power supply system of the hybrid vehicle in the embodiment of the present invention described with reference to FIGS. 5 to 10.

With reference to FIG. 11, in the period to time t1 in which the variable is ID=0, the switching determination process is performed periodically as predetermined, based on the SOC of the currently selected sub power storage device (battery BB1 for example).

At time t1, in response to decrease in SOC of battery BB1, a request to switch selected sub power storage device BB is issued through the switching determination process (step S100), and the variable is set to ID=1 to start the switching process.

Thus the pre-switching voltage step up process (step S200) is performed and converter 12A increases voltage VH on electric power feeding line PL2 toward predetermined voltage V1. The process for stepping up the voltage on electric power feeding line PL2 is completed at time t2, and accordingly variable ID is changed from 1 to 2.

When the variable is changed to ID=2, the electric power limit modification process (S300) is performed to temporarily relax charging and discharging of main power storage device BA. Specifically, a temporary increase of respective absolute values of the upper limits on electric power input and output Win(M) and Wout(M) is started. Further, the upper limits on electric power input and output Win(S) and Wout(S) of selected sub power storage device BB are gradually decreased toward zero at a fixed rate. In this period, converter 12B is controlled to stop charging/discharging the currently selected sub power storage device (battery BB1). Alternatively, converter 12B may have been shut down since time t1.

At time t3, the upper limits on electric power input and output Win(S) and Wout(S) of selected sub power storage device BB have been decreased to zero, and ID is changed from 2 to 3. When the variable is set to ID=3, the connection switching process for the sub power storage device is started. Specifically, while converter 12A is shut down, relays SR1, SR1G are turned off and thereafter relays SR2, SR2G are turned on. The process for switching connections of the relays is thus completed, and battery BB2 as a newly selected sub power storage device is connected to converter 12B, and converter 12B is started again. These processes for switching connection are completed, and ID is changed from 3 to 4 at time t4.

The variable is thus set to ID=4, and the upper limits on electric power input and output Win(S) and Wout(S) of selected sub power storage device BB are gradually increased at a fixed rate. Then, use of battery BB2 that is the newly selected sub power storage device is started. Accordingly, the temporary relaxation of the restriction on charging and discharging of main power storage device BA is ended, and Wout(M) and Win(M) are basically changed back to respective values before time t2.

At time t5, Win(S) and Wout(S) of selected sub power storage device BB recovers respective original values corresponding to Wout and Win of battery BB2, and the variable is caused to be ID=0 again. Then, the process for stepping up the voltage on power feeding line PL2 is stopped.

Accordingly, the series of switching processes for the selected sub power storage device is ended, and the state where electric power can be supplied and recovered normally using selected sub power storage device BB (battery BB2) is reproduced.

At time t5, as described with reference to FIG. 10, it may be determined whether there is a possibility of further switching the sub power storage device while the vehicle is being driven and, when there is no possibility that the switching process is performed, the variable may be set to ID=−1. Thus, the subsequent load on control device 30 can be reduced.

Further, in order to restrict start/stop of the engine as will be described later, a flag RQES for prohibiting the process for stopping or starting the engine while the process for switching selected sub power storage device BB is performed is rendered ON in the period in which the variable is ID=1 to 4.

Hereinafter reference will be made to FIGS. 12 and 13 to describe a control process for a hybrid vehicle in an embodiment of the present invention, following which further execution (start) of a process for starting engine 4 and a process for stopping engine 4 are permitted.

Figure 12:
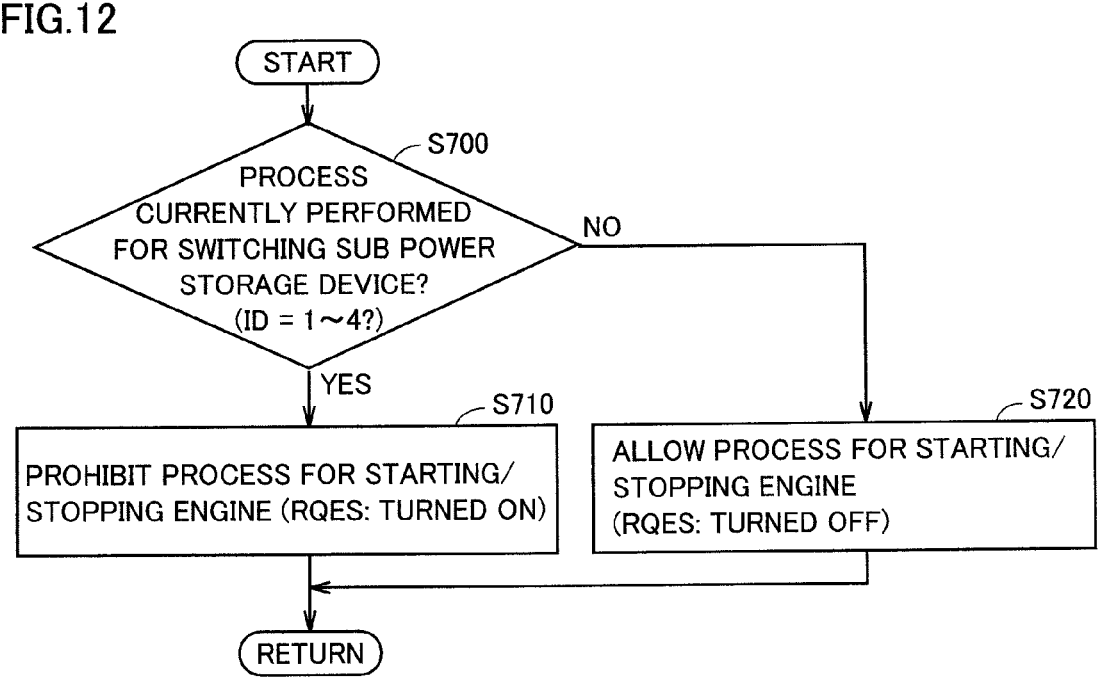
FIG. 12 is a first flowchart for illustrating a control process for restricting start/stop of an engine in a hybrid vehicle in an embodiment of the present invention.

With reference to FIG. 12, control device 30 determines in step S700 from variable ID whether a process is currently performed to switch a sub power storage device. More specifically, when the variable is ID=1 to 4 (YES in S700), control device 30 proceeds to step S710 to set flag RQES ON. This prohibits further execution (or start) of a process for starting engine 4 and that for stopping engine 4. When the variable is not ID=1 to 4 (NO in S700), typically when the variable is ID=0, control device 30 proceeds to step S720 to set flag RQES OFF. This permits further execution (or start) of the process for starting engine 4 and that for stopping engine 4.

Figure 13:
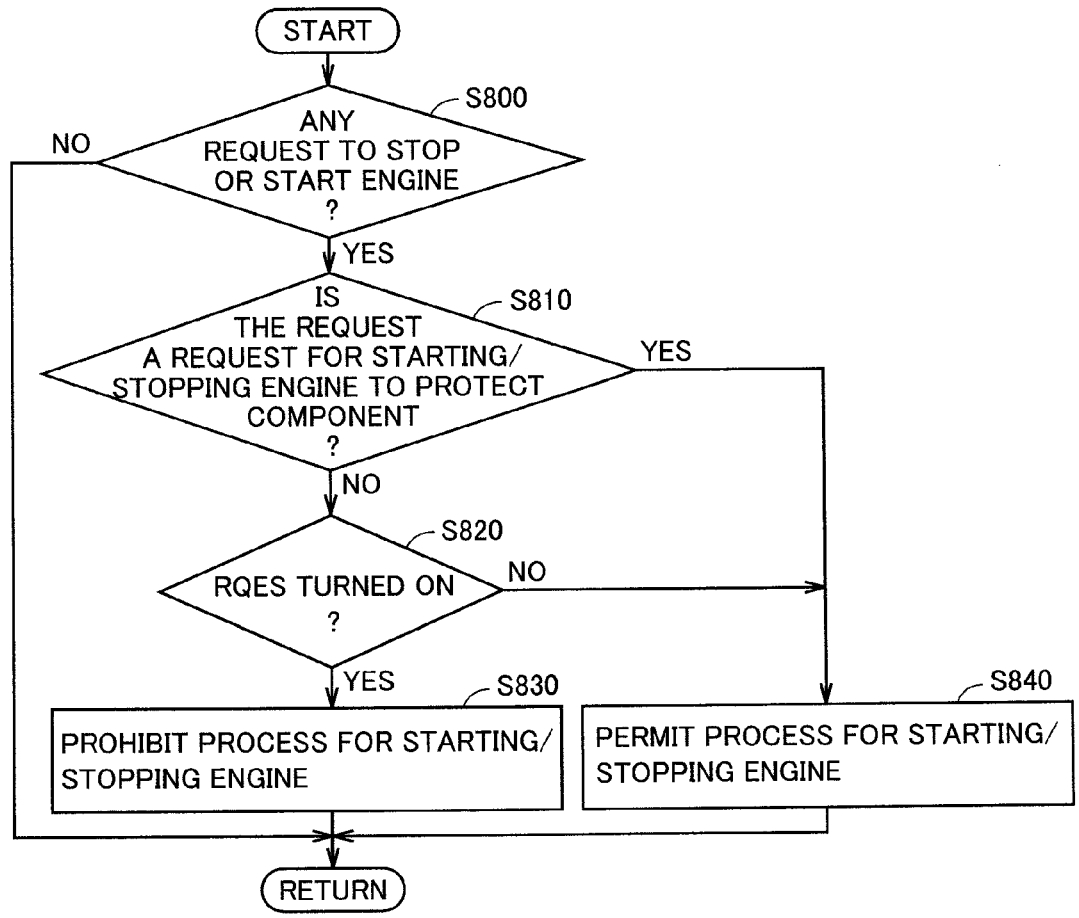
FIG. 13 is a second flowchart for illustrating a control process for restricting start/stop of an engine in a hybrid vehicle in an embodiment of the present invention.

FIG. 13 is a flowchart for illustrating the engine start/stop restriction following flag RQES.

With reference to FIG. 13, control device 30 determines in step S800 whether a stop or start engine request is made. As described above, the stop engine request and the start engine request are generated, based on a comparison between an upper limit on electric power input/output of the power supply system as a whole and total required power Pttl, or in order to protect components, for example, when the rotation speed of engine 4 or motor generator MG1 increases excessively, to suppress such increase.

When a request is generated to stop or start engine 4 (YES in S800), control device 30 proceeds to step S810 to determine whether the request to start engine 4 or the request to stop engine 4 has been made for the purpose of protecting components.

When the request to stop or the request to start the engine has not been made for the purpose of protecting components (NO in S810), control device 30 further proceeds to step S820 to determine from flag RQES whether the process for starting/stopping the engine should be permitted or prohibited. More specifically, when flag RQES is set ON (YES in S820), namely when a process for switching a sub power storage device is currently performed, control device 30 proceeds to step S830 to prohibit the process for starting/stopping engine 4. In that case, even when the request to start engine 4 or the request to stop engine 4 is generated, traveling control unit 250 (FIG. 4) does not generate the start engine command or the stop engine command until the process for switching a sub power storage device is ended and flag RQES is accordingly set OFF.

In contrast, when flag RQES is set OFF (NO in S820), control device 30 proceeds to step S840 to permit start of the process for starting engine 4 or the process for stopping the engine in response to the request to start the engine or the request to stop the engine.

When the stop engine request or the start engine request is generated for the purpose of protecting components (YES in S810), control device 30 proceeds to step S840 to permit the engine starting process and the engine stopping process regardless of flag RQES, namely even when the process for switching a sub power storage device is being performed. In other words, the stop engine request or the start engine request for the purpose of protecting components is preferentially permitted.

Figure 14:
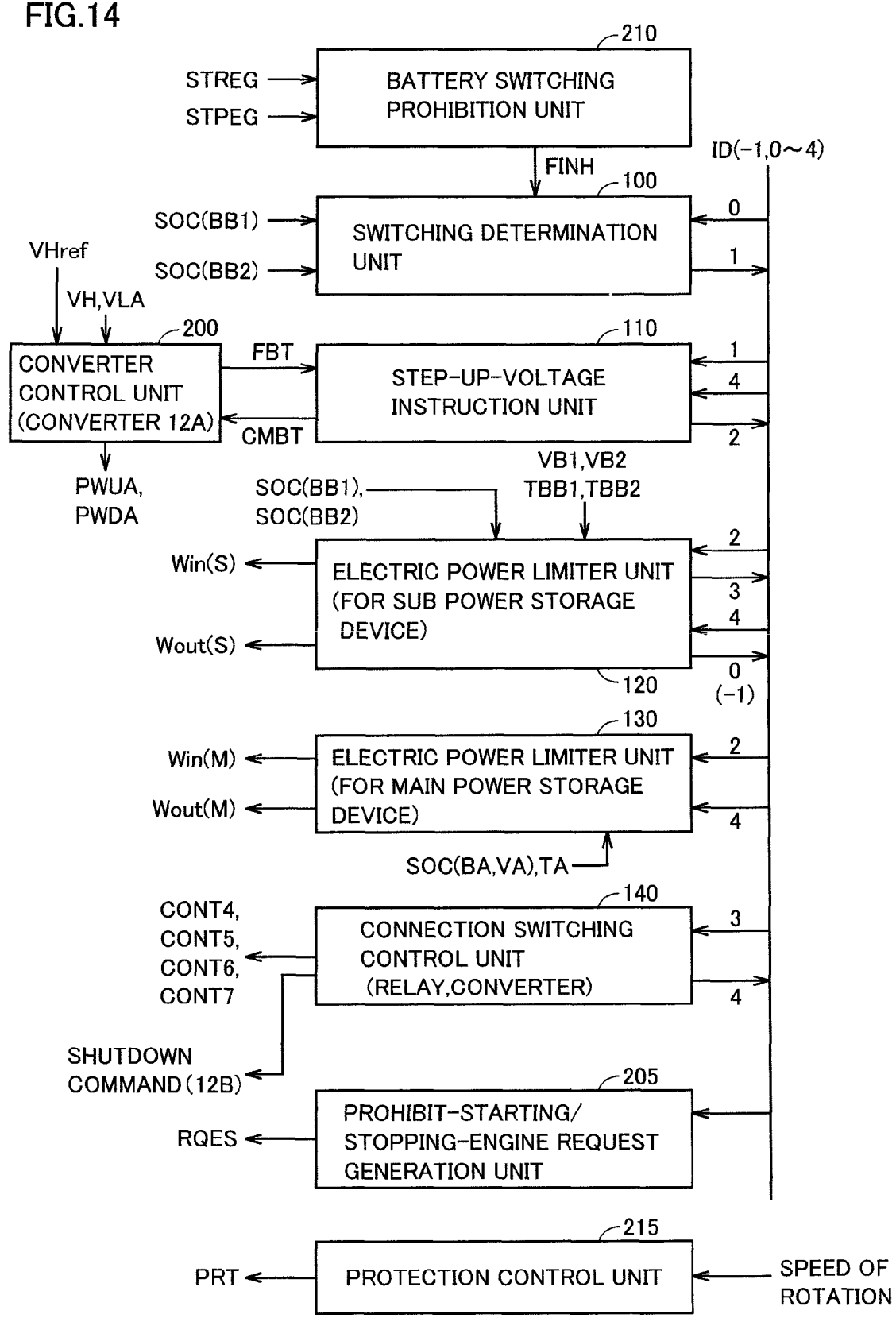
FIG. 14 is a functional block diagram for illustrating functional elements in a control configuration for a hybrid vehicle in an embodiment of the present invention, for switching a selected sub power storage device and restricting start/stop of an engine.

FIG. 14 is a functional block diagram for illustrating functional elements in a control configuration for a hybrid vehicle in an embodiment of the present invention, for switching a selected sub power storage device and restricting engine start/stop. The functional blocks shown in FIG. 14 are each implemented by software processing through execution of a predetermined program or by dedicated electronic circuitry (hardware processing).

With reference to FIG. 12, a switching determination unit 100 receives SOC(BB1) and SOC(BB2) indicating respective states of charge of batteries BB1 and BB2, respectively, and determines whether the SOC of selected sub power storage device BB that is currently used falls below a predetermined reference value. When variable ID shared by the functional blocks is 0, switching determination unit 100 makes the above-described determination periodically as predetermined and, when it becomes necessary to switch the selected sub power storage device, switching determination unit 100 changes ID from 0 to 1. Accordingly, a request to switch the selected sub power storage device is generated. Namely, the function of switching determination unit 100 corresponds to the process in step S110 of FIG. 5.

A battery switching prohibition unit 210 outputs, to switching determination unit 100, a flag FINH for prohibiting generation of the request to switch, during the engine starting process and the engine stopping process, based on flag STPEG indicating that the engine stopping process is currently performed and flag STREG indicating that the engine starting process is currently performed. More specifically, when one of flags STREG and STPEG is set ON, prohibition flag FINH is set ON, and when flags STREG and STPEG are both set OFF, prohibition flag FINH is set OFF.

When prohibition flag FINH is set ON, switching determination unit 100 holds ID=0 regardless of the SOC of selected sub power storage device BB. In other words, the function of battery switching prohibition unit 210 corresponds to the process in step S120 of FIG. 6.

When a request to switch the selected sub power storage device is generated and the variable is set to ID=1, a step-up-voltage instruction unit 110 outputs a step up voltage command signal CMBT to a converter control unit 200 controlling converter 12A.

Converter control unit 200 generates control signals PWUA, PWDA for converter 12A, based on voltages VH, VLA and voltage command value VHref, so that voltage VH on electric power feeding line PL2 reaches voltage command value VHref.

Further, when step-up-voltage instruction unit 110 generates step up voltage command signal CMBT, converter control unit 200 sets the voltage command value as VHref=V1 and generates control signal PWUA. When voltage sensor 13 senses voltage VH having reached predetermined voltage V1 and being kept at the voltage continuously for at least a predetermined period of time, converter control unit 200 sets a flag FBT ON that indicates that the voltage has been stepped up.

In response to flag FBT that is set ON, step-up-voltage instruction unit 110 changes the variable to ID=2, and continues outputting step up voltage command signal CMBT until a connection switching control unit 140, which will be described later, completes switching of relay connections and accordingly the variable is set to ID=4. In other words, the function of step-up-voltage instruction unit 110 corresponds to the processes in step S200 of FIG. 5 and step S550 of FIG. 10.

An electric power limiter unit 120 sets the upper limits on electric power input and output Win(S) and Wout(S) of selected sub power storage device BB. Normally, the upper limits on electric power input and output Win(S) and Wout(S) are set based on the SOC of the battery that is selected sub power storage device BB (SOC(BB1) or SOC(BB2)), battery temperature (TBB1 or TBB2), and output voltage (VB1 or VB2).

In contrast, in the process for switching a selected sub power storage device, when the variable is set to ID=2, electric power limiter unit 120 decreases the upper limits on electric power input and output Win(S) and Wout(S) gradually at a fixed rate toward zero and, when Win(S) and Wout(S) reach zero, changes ID from 2 to 3. Further, when the variable is set to ID=4 by connection switching control unit 140, electric power limiter unit 120 increases the upper limits on electric power input and output Win(S) and Wout(S) to respective values corresponding to Win and Win of newly selected sub power storage device BB to which the former device is switched. When the upper limits have been increased, ID is changed from 4 to 0.

In other words, electric power limiter unit 120 implements the processes in steps S320 to S340 of FIG. 8, the processes in steps S520 to S540 of FIG. 10, as well as respective functions of "first electric power limiter unit" and "second electric power limiter unit" of the present invention.

An electric power limiter unit 130 sets the upper limits on electric power input and output Win(M) and Wout(M) of main power storage device BA. Normally, the upper limits on electric power input and output Win(M) and Wout(M) are set based on the SOC(BA) of main power storage device BA as well as battery temperature TA and output voltage VA thereof.

In contrast, in the process for switching a sub power storage device, electric power limiter unit 130 temporarily increases, when the variable is set to ID=2, respective absolute values of the upper limits on electric power input Win(M) and Wout(M) and accordingly relaxes restriction on charging and discharging of main power storage device BA. Then, when connection switching control unit 140 sets the variable to ID=4, electric power limiter unit 130 causes the upper limits on electric power input and output Win(M) and Wout(M) to recover normal values.

In other words, electric power limiter unit 130 implements the processes in step S310 of FIG. 8 and step S510 of FIG. 10 as well as the function of "third electric power limiter unit" of the present invention.

When electric power limiter unit 120 sets the variable to ID=3, connection switching control unit 140 generates a command to shut down converter 12B, and further generates relay control signals CONT4 to CONT7 for switching connections between converter 12B and sub power storage devices BB1 and BB2. For example, when selected sub power storage device BB is to be switched from battery BB1 to battery BB2, relay control signals CONT4 to CONT7 are generated so that relays SR1 and SR1G are turned off while relays SR2 and SR2G are turned on. When the process for switching relay connections is completed, the above-described shut down command is stopped to restart converter 12B and ID is changed from 3 to 4.

Connection switching control unit 140 corresponds to the process in step S400 of FIG. 5 (S405 to S450 of FIG. 9).

A prohibit-starting/stopping-engine request generation unit 205 sets flag RQES ON when the variable is ID=1 to 4 and otherwise sets flag RQES OFF. In other words, the function of prohibit-starting/stopping-engine request generation unit 205 corresponds the processes in steps S700 to S720 of FIG. 12.

A protection control unit 215 generates, based on the speed of rotation of a rotary element (motor generator MG1, engine 4 and the like for example) coupled to power split device 3, a start/stop engine request (not shown) for protecting components and also sets a flag PRT ON that indicates that the request is a start/stop engine request for protecting components.

In other words, the processes in steps S810 to S840 of FIG. 13 can be performed by traveling control unit 250 (FIG. 4) based on flags PRT and RQES.

As heretofore described, with a hybrid vehicle and a method for controlling the same in an embodiment of the present invention, execution of a process for starting or stopping an internal combustion engine can be prohibited while a process for switching connection of a sub power storage device is performed, and execution of the process for switching connection of a sub power storage device can be prohibited while the process for starting or stopping the internal combustion engine is performed. In this way, while the process for switching connection of a sub power storage is performed, the vehicle driving power that can be output can be prevented from varying due to input and output of electric power required in the process for starting or stopping the engine. Therefore, the vehicle's drivability can be prevented from being adversely affected by the process for switching connection.

Moreover, while the process for switching a selected sub power storage device is performed, the upper limits on electric power input and output Win(S) and Wout(S) of selected sub power storage device BB are appropriately limited, and thus a request for excessive charging and discharging can be prevented from being made to the power supply system. Accordingly, in a power supply system configured to share a plurality of sub power storage devices by one voltage converter (converter), the process for switching connections of sub power storage devices when a selected sub power storage device is to be switched can be appropriately and smoothly performed.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A hybrid vehicle comprising:
a motor for generating power to drive the vehicle;
an internal combustion engine configured to be capable of outputting power to drive the vehicle independently of said motor;
a main power storage device;
an electric power feeding line for supplying electric power to an inverter that controls and drives said motor;
a first voltage converter provided between said electric power feeding line and said main power storage device and configured to convert voltage bidirectionally;
a plurality of sub power storage devices provided in parallel to each other;
a second voltage converter provided between said plurality of sub power storage devices and said electric power feeding line and configured to convert voltage between one of said plurality of sub power storage devices and said electric power feeding line bidirectionally;
a connection unit provided between said plurality of sub power storage devices and said second voltage converter and configured to selectively connect a selected sub power storage device among said plurality of sub power storage devices to said second voltage converter;
a switching control device configured to control selective connection between said plurality of sub power storage devices and said second voltage converter; and
a traveling control unit for dividing and thus assigning a total required power for hybrid vehicle to power output from said motor and power output from said internal combustion engine,
said traveling control unit including means for prohibiting a process for starting said internal combustion engine which is being stopped and prohibiting a process for stopping said internal combustion engine which is being operated, while a process for switching connection between said plurality of sub power storage devices and said second voltage converter is being performed.

2. The hybrid vehicle according to claim 1, further comprising:
a rotary element having a speed of rotation varied according to change in output of said internal combustion engine; and
a protection control unit for generating one of a request to start said internal combustion engine and a request to stop said internal combustion engine for preventing excessive rotation of said rotary element, wherein
said traveling control unit permits one of said process for starting said internal combustion engine and said process for stopping said internal combustion engine, regardless of whether said process for switching connection is being performed, when said protection control unit generates one of said request to start said internal combustion engine and said request to stop said internal combustion engine.

3. The hybrid vehicle according to claim 1, wherein
said switching control device includes:
a switching determination unit configured to determine, based on a state of charge of a residual capacity of said selected sub power storage device currently used, whether generation of a request to switch said selected sub power storage device is necessary; and
a switching prohibition unit configured to instruct said switching determination unit not to generate said request to switch, while said process for starting or said process for stopping said internal combustion engine is being performed.

4. A hybrid vehicle mounted with a motor for generating power to drive the vehicle and an internal combustion engine configured to be capable of outputting power to drive the vehicle independently of said motor, said hybrid vehicle comprising:

a main power storage device;

an electric power feeding line for supplying electric power to an inverter that controls and drives said motor;

a first voltage converter provided between said electric power feeding line and said main power storage device and configured to convert voltage bidirectionally;

a plurality of sub power storage devices provided in parallel to each other;

a second voltage converter provided between said plurality of sub power storage devices and said electric power feeding line and configured to convert voltage between one of said plurality of sub power storage devices and said electric power feeding line bidirectionally;

a connection unit provided between said plurality of sub power storage devices and said second voltage converter and configured to selectively connect a selected sub power storage device among said plurality of sub power storage devices to said second voltage converter; and a switching control device configured to control selective connection between said plurality of sub power storage devices and said second voltage converter, said switching control device including:

a switching determination unit for determining, based on a state of charge of a residual capacity of said selected sub power storage device being used, whether generation of a request to switch said selected sub power storage device is necessary; and prohibition means for instructing said switching determination unit not to generate the request to switch said selected sub power storage device, while a process for starting or a process for stopping said internal combustion engine is being performed.

5. The hybrid vehicle according to claim 3, wherein said switching control device further includes:

a step-up-voltage instruction unit configured to instruct, when said request to switch is generated, said first voltage converter to cause a voltage on said electric power feeding line to be a first voltage higher than an output voltage of said main power storage device and an output voltage of a sub power storage device to be connected to said second voltage converter after switch has been made;

a first electric power limiter unit configured to gradually decrease an upper limit on electric power input and output to and from said selected sub power storage device to zero, after the voltage on said electric power feeding line has reached said first voltage;

a connection switching control unit configured to switch connection between said plurality of sub power storage devices and said second voltage converter, when said first electric power limiter unit has set said upper limit on electric power input and output to zero; and a second electric power limiter unit configured to gradually increase said upper limit on electric power input and output to a value corresponding to a state of charge of a sub power storage device newly connected to said second voltage converter after said connection switching control unit has switched connection between the plurality of sub power storage devices and said second voltage converter.

6. A method for controlling a hybrid vehicle, said hybrid vehicle including:

a motor for generating power to drive the vehicle;

an internal combustion engine configured to be capable of outputting power to drive the vehicle independently of said motor;

a main power storage device;

an electric power feeding line for supplying electric power to an inverter that controls and drives said motor;

a first voltage converter provided between said electric power feeding line and said main power storage device and configured to convert voltage bidirectionally;

a plurality of sub power storage devices provided in parallel to each other;

a second voltage converter provided between said plurality of sub power storage devices and said electric power feeding line and configured to convert voltage between one of said plurality of sub power storage devices and said electric power feeding line bidirectionally;

a connection unit provided between said plurality of sub power storage devices and said second voltage converter and configured to selectively connect a selected sub power storage device among said plurality of sub power storage devices to said second voltage converter;

a switching control device configured to control selective connection between said plurality of sub power storage devices and said second voltage converter; and a traveling control unit for dividing and thus assigning a total required power for said hybrid vehicle to power output from said motor and power output from said internal combustion engine, said method comprising the steps of:

determining whether a process for switching connection between said plurality of sub power storage devices and said second voltage converter is being performed; and prohibiting a process for starting said internal combustion engine which is being stopped and a process for stopping said internal combustion engine which is being operated, while said process for switching is being performed.

7. A method for controlling a hybrid vehicle, said hybrid vehicle including:

a motor for generating power to drive the vehicle;

an internal combustion engine configured to be capable of outputting power to drive the vehicle independently of said motor;

a main power storage device;

an electric power feeding line for supplying electric power to an inverter that controls and drives said motor;

a first voltage converter provided between said electric power feeding line and said main power storage device and configured to convert voltage bidirectionally;

a plurality of sub power storage devices provided in parallel to each other;

a second voltage converter provided between said plurality of sub power storage devices and said electric power feeding line and configured to convert voltage between one of said plurality of sub power storage devices and said electric power feeding line bidirectionally;

a connection unit provided between said plurality of sub power storage devices and said second voltage converter and configured to selectively connect a selected sub power storage device among said plurality of sub power storage devices to said second voltage converter;

a switching control device configured to control selective connection between said plurality of sub power storage devices and said second voltage converter;

a traveling control unit for dividing and thus assigning a total required power for said hybrid vehicle to power output from said motor and power output from said internal combustion engine;
a rotary element having a speed of rotation varied according to change in output of said internal combustion engine; and
a protection control unit for generating one of a request to start said internal combustion engine and a request to stop said internal combustion engine for preventing excessive rotation of said rotary element,
said method comprising the steps of:
determining whether a process for switching connection between said plurality of sub power storage devices and said second voltage converter is being performed;
prohibiting a process for starting said internal combustion engine which is being stopped and a process for stopping said internal combustion engine which is being operated, while said process for switching is being performed, and
permitting one of said process for starting said internal combustion engine and said process for stopping said internal combustion engine, regardless of whether said process for switching connection is being performed, when said protection control unit generates one of said request to start said internal combustion engine and said request to stop said internal combustion engine.

8. The method for controlling a hybrid vehicle according to claim 6, further comprising the steps of:
determining, based on a state of charge of a residual capacity of the selected sub power storage device currently used, whether generation of a request to switch said selected sub power storage device is necessary; and
issuing an instruction not to generate said request to switch, regardless of the state of charge of said selected sub power storage device, while said process for starting or said process for stopping said internal combustion engine is being performed.

9. A method for controlling a hybrid vehicle,
said hybrid vehicle including:
a motor for generating power to drive the vehicle;
an internal combustion engine configured to be capable of outputting power to drive the vehicle independently of said motor;
a main power storage device;
an electric power feeding line for supplying electric power to an inverter that controls and drives said motor;
a first voltage converter provided between said electric power feeding line and said main power storage device and configured to convert voltage bidirectionally;
a plurality of sub power storage devices provided in parallel to each other;
a second voltage converter provided between said plurality of sub power storage devices and said electric power feeding line and configured to convert voltage between one of said plurality of sub power storage devices and said electric power feeding line bidirectionally;
a connection unit provided between said plurality of sub power storage devices and said second voltage converter and configured to selectively connect a selected sub power storage device among said plurality of sub power storage devices to said second voltage converter; and
a switching control device configured to control selective connection between said plurality of sub power storage devices and said second voltage converter,
said method comprising the steps of:
determining, based on a state of charge of a residual capacity of the selected sub power storage device being used, whether generation of a request to switch said selected sub power storage device is necessary; and
issuing an instruction not to generate said request to switch, regardless of the state of charge of said selected sub power storage device, while a process for starting or a process for stopping said internal combustion engine is being performed.

10. The method for controlling a hybrid vehicle according to claim 8, further comprising the steps of:
instructing said first voltage converter, when said request to switch is generated, to cause a voltage on said electric power feeding line to be a first voltage higher than an output voltage of said main power storage device and an output voltage of a sub power storage device to be connected to said second voltage converter after switch has been made;
gradually decreasing an upper limit on electric power input and output to and from said selected sub power storage device to zero, after the voltage on said electric power feeding line has reached said first voltage;
switching connection between said plurality of sub power storage devices and said second voltage converter, when said upper limit on electric power input and output is set to zero by said step of gradually decreasing the upper limit; and
gradually increasing said upper limit on electric power input and output to a value corresponding to a state of charge of the sub power storage device newly connected to said second voltage converter after said connection between the plurality of sub power storage devices and said second voltage converter has been switched by said step of switching.

11. The hybrid vehicle according to claim 4, wherein
said switching control device further includes:
a step-up-voltage instruction unit configured to instruct, when said request to switch is generated, said first voltage converter to cause a voltage on said electric power feeding line to be a first voltage higher than an output voltage of said main power storage device and an output voltage of a sub power storage device to be connected to said second voltage converter after switch has been made;
a first electric power limiter unit configured to gradually decrease an upper limit on electric power input and output to and from said selected sub power storage device to zero, after the voltage on said electric power feeding line has reached said first voltage;
a connection switching control unit configured to switch connection between said plurality of sub power storage devices and said second voltage converter, when said first electric power limiter unit has set said upper limit on electric power input and output to zero; and
a second electric power limiter unit configured to gradually increase said upper limit on electric power input and output to a value corresponding to a state of charge of a sub power storage device newly connected to said second voltage converter after said connection switching control unit has switched connection between the plurality of sub power storage devices and said second voltage converter.

12. The method for controlling a hybrid vehicle according to claim 9, further comprising the steps of:
instructing said first voltage converter, when said request to switch is generated, to cause a voltage on said electric power feeding line to be a first voltage higher than an output voltage of said main power storage device and an output voltage of a sub power storage device to be connected to said second voltage converter after switch has been made;

gradually decreasing an upper limit on electric power input and output to and from said selected sub power storage device to zero, after the voltage on said electric power feeding line has reached said first voltage;

switching connection between said plurality of sub power storage devices and said second voltage converter, when said upper limit on electric power input and output is set to zero by said step of gradually decreasing the upper limit; and gradually increasing said upper limit on electric power input and output to a value corresponding to a state of charge of the sub power storage device newly connected to said second voltage converter after said connection between the plurality of sub power storage devices and said second voltage converter has been switched by said step of switching.

\* \* \* \* \*